US010212707B2

(12) United States Patent
Wei

(10) Patent No.: US 10,212,707 B2
(45) Date of Patent: *Feb. 19, 2019

(54) METHOD, BASE STATION, TERMINAL AND COMMUNICATION SYSTEM FOR UPDATING COMPONENT CARRIER

(71) Applicant: Sony Corporation, Tokyo (JP)

(72) Inventor: Yuxin Wei, Beijing (CN)

(73) Assignee: SONY CORPORATION, Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 15/624,347

(22) Filed: Jun. 15, 2017

(65) Prior Publication Data

US 2017/0290019 A1 Oct. 5, 2017

Related U.S. Application Data

(60) Division of application No. 14/551,177, filed on Nov. 24, 2014, now Pat. No. 9,750,023, which is a
(Continued)

(30) Foreign Application Priority Data

Apr. 30, 2010 (CN) .......................... 2010 1 0162513

(51) Int. Cl.
*H04W 72/04* (2009.01)
*H04L 5/00* (2006.01)
(Continued)

(52) U.S. Cl.
CPC ......... *H04W 72/0453* (2013.01); *H04L 5/001* (2013.01); *H04W 74/0833* (2013.01); *H04L 5/0098* (2013.01); *H04W 88/08* (2013.01)

(58) Field of Classification Search
CPC .......... H04W 72/0453; H04W 74/0833; H04L 5/001
See application file for complete search history.

(56) References Cited

U.S. PATENT DOCUMENTS 9,191,810 B2 * 11/2015 Kuo ......................... H04L 63/20
9,750,023 B2 * 8/2017 Wei ................... H04W 72/0453
(Continued)

FOREIGN PATENT DOCUMENTS

CN 101540978 9/2009
CN 101674586 3/2010
(Continued)

OTHER PUBLICATIONS

International Search Report dated Jul. 7, 2011 in PCT/CN11/072407 Filed Apr. 2. 2011.
(Continued)

*Primary Examiner* — Robert M Morlan
*Assistant Examiner* — Pamit Kaur
(74) *Attorney, Agent, or Firm* — Xsensus, LLP

(57) ABSTRACT

A method, base station, terminal and communication system for updating component carriers are provided. Wherein, status information of the terminal, base station and/or component carrier is acquired; whether the status information accords with the predetermined condition is determined; an old component carrier is replaced by a new component carrier, or a new component carrier is added in the even that the predetermined condition is met. With the embodiments of the present invention, the component carrier which the terminal would use is updated more effectively.

22 Claims, 17 Drawing Sheets

Related U.S. Application Data continuation of application No. 13/641,549, filed as application No. PCT/CN2011/072407 on Apr. 2, 2011, now Pat. No. 9,179,462.

(51) Int. Cl.
*H04W 74/08* (2009.01)
*H04W 88/08* (2009.01)

(56) References Cited

U.S. PATENT DOCUMENTS

| | | | |
|---|---|---|---|
| 2008/0287068 A1* | 11/2008 | Etemad | H04L 5/0007 455/68 |
| 2009/0257533 A1 | 10/2009 | Lindoff et al. | |
| 2010/0303039 A1* | 12/2010 | Zhang | H04L 5/0035 370/331 |
| 2011/0243048 A1 | 10/2011 | Wang | |
| 2011/0267978 A1 | 11/2011 | Etemad | |
| 2012/0003943 A1 | 1/2012 | Marinier | |
| 2013/0153298 A1* | 6/2013 | Pietraski | E21B 7/04 175/45 |

FOREIGN PATENT DOCUMENTS

| | | |
|---|---|---|
| JP | 2007-43573 | 2/2007 |
| WO | WO 2010/032675 A1 | 3/2010 |

OTHER PUBLICATIONS

3GPP TSG RAN WG1 #57 R1-091779, "Primary Component Carrier Selection, Monitoring, and Recovery," Nokia Siemens Networks, Nokia, Total 6 Pages, (May 4 to 8, 2009).

3GPP TSG RAN WG1 #69 R2-101144, "Handover with Carrier Aggregation," MeditaTek Inc., pp. 1 to 6, (Feb. 22 to 26, 2010).

Korean Office Action dated Mar. 9, 2015 in Korean patent Application No. 10-214-7034252. With English translation (8 pages).

3GPP TS 36.331 V9.2.0 (Mar. 2010) (248 pages).

"Optimization of System Information Handling in Carrier Aggregation", EGPP TSG RAN WG2 #69, bis, R2-102203, Apr. 16, 2010 (3 pages).

3GPP TSG-RAN WG2 meeting #68bis, R2-100789, "Stage 2 description of Carrier Aggregation", Nokia Siemens Networks, Jan. 18-22, 2010, 16 pages.

* cited by examiner

METHOD, BASE STATION, TERMINAL AND COMMUNICATION SYSTEM FOR UPDATING COMPONENT CARRIER

CROSS REFERENCE TO RELATED APPLICATIONS

This application is a Divisional of and is based upon and claims the benefit of U.S. Ser. No. 14/551,177, filed Nov. 24, 2014, which is a Continuation of U.S. Ser. No. 13/641,549, filed Oct. 16, 2012, the entire contents of which are incorporated herein by reference. U.S. Ser. No. 13/641,549 is the national stage of PCT/CN11/072407, filed Apr. 2, 2011, and claims the benefit of priority under 35 U.S.C. § 119 from Chinese Patent Application No. 201010162513.4, filed Apr. 30, 2010.

FIELD OF THE INVENTION

The present application generally relates to the field of wireless communication, and in particular to the field of carrier aggregation communication. More particularly, the present application relates to a method for selecting a component carrier and a method for updating a component carrier in a carrier aggregating communication network. The present application further relates to a device for implementing the above method, including a base station, a terminal, and a communication system including the base station and the terminal.

BACKGROUND OF THE INVENTION

Future LTE-A (Long Term Evolution-Advanced) system will support a transmission bandwidth up to 100 MHz. However, the maximum supportable transmission bandwidth in LET (Long Term Evolution) standard is 20 MHz, and thus it is necessary to aggregate multiple carriers to achieve wider transmission bandwidth. Carrier aggregation is a technique proposed by 3GPP (3rd Generation Partnership Project) to aggregate multiple carriers for joint transmission, so as to support the higher requirement on the transmission bandwidth by the future mobile communication systems. According to the position of the carriers to be aggregating in the frequency spectrum, the carrier aggregation can be classified into continuous carrier aggregation and non-continuous carrier aggregation, and LIE-A simultaneously supports both of the two aggregation scenes. While introducing the carrier aggregation technique, 3GPP also takes into consideration of the backward compatibility. This means that for a long period of time in the future, terminals that support carrier aggregation and terminals that do not support carrier aggregation will coexist, the terminals that support carrier aggregation can access multiple carriers at the same time, and the terminals that do not support carrier aggregation can access only one carrier.

To simplify the radio resource management in the carrier aggregation scene, a concept of primary component carrier (PCC) will be introduced into LTE-A. Therefore, the carrier management in the carrier aggregation scene will develop from the distributed management towards the centralized management. Thus, the primary component carrier will necessarily have functions a common carrier does not have, playing an important part in the radio resource management.

Naturally, the carrier corresponding to the cell for the initial access of the terminal is selected as the primary component carrier. However, with the increasing requirement on the quality of service by the user, it may be necessary to add a new carrier to form the carrier aggregation. With the variation in the terminal, the base station and the network conditions, it is also possible to replace or delete some carriers in use. Because of the movement of the user and the difference between the performances of the carriers that are aggregating, it may be necessary to re-designate the primary component carrier.

SUMMARY OF THE INVENTION

Hereinafter, a brief summary of the present invention will be given, so as to provide basic understanding of some aspects of the present invention. It is to be understood that this summary is not an exhaustive summary about the present invention. It is not intended to determine the key or important part of the present invention, or to define the scope of the present invention. It only aims to give some concepts in a simplified form to serve as a preface to the more detailed description discussed later.

An object of the present application is to provide a method and a device for selecting a component carrier, including a base station and a terminal. A further object of the present application is to provide a method and a device for updating a primary component carrier, including a base station and a terminal; a method and a device for adding a secondary component carrier, including a base station and a terminal; and a communication system including the base station and the terminal.

Thus, according to a first aspect of the present application, there is provided a method for selecting a component carrier in a carrier aggregating communication network, the method including: determining a coverage range of each available carrier that can be used by a terminal; determining whether a distribution of the coverage ranges of different available carriers accords with a predetermined distribution mode; and determining a component carrier to be used at least according to a rule that is decided by the distribution mode, in the case that the distribution of the coverage ranges of different available carriers accords with the predetermined distribution mode.

According to another aspect of the present application, there is provided a method for updating a primary component carrier in a carrier aggregating communication network, the method including: determining a new primary component carrier with the method of the first aspect described above; and handover from an old primary component carrier to the new primary component carrier.

According to yet another aspect of the present application, there is provided a method for adding a secondary component carrier in a carrier aggregating communication network, the method including: determining a new secondary component carrier with the method of the first aspect described above; and adding the new secondary component carrier.

According to still another aspect of the present application, there is provided a device in a carrier aggregating communication network, the device including: a terminal information acquiring unit for acquiring position information of a terminal and/or carrier distribution information corresponding to the position of the terminal; a carrier distribution mode determining unit for determining whether a distribution of the coverage ranges of different available carriers corresponding to the position of the terminal accords with a predetermined distribution mode; a component carrier determining unit for determining a component carrier to be used at least according to a rule that is decided by the distribution mode, in the case that the distribution of the coverage ranges of different available carriers corresponding to the position of the terminal accords with the predetermined distribution mode; and a notifying unit for notifying the component carrier determined to be used to a counterpart device.

Wherein, the component carrier can be a primary component carrier, and can also be a secondary component carrier.

The above device can be a base station, and wherein the counterpart device is a terminal that communicates with the base station.

The above device can also be a terminal, and wherein the counterpart device is a base station that communicates with the terminal.

According to a further aspect of the present application, there is further provided a communication system including the above mentioned base station and/or terminal.

According to the above various embodiments, it is possible to reasonably select the component carrier to be used.

Another object of the present application is to provide a method for updating a primary component carrier, and a corresponding base station, terminal and communication system.

Thus, according to an aspect of the present application, there is provided a method for updating a primary component carrier in a carrier aggregating communication network, the method including: acquiring status information of a terminal, a base station and/or a primary component carrier; determining whether the status information meets a predetermined condition; and replacing an old primary component carrier with a new primary component carrier in the case that the status information meets the predetermined condition.

According to another aspect of the present application, there is provided a base station in a carrier aggregating communication network, the base station including: a status acquiring unit for acquiring status information of a terminal, a base station and/or a primary component carrier; a status determining unit for determining whether the status information meets a predetermined condition; and a primary component carrier updating unit for replacing an old primary component carrier with a new primary component carrier in the case that the status information meets the predetermined condition.

According to yet another aspect of the present application, there is provided a terminal adapted for a carrier aggregating communication network, the terminal including: a reconfiguration information receiving unit for receiving "radio resource control" reconfiguration information from a base station; a radio resource configuring unit for configuring a new primary component carrier according to radio resource configuration information contained in the "radio resource control" reconfiguration information; and a deactivating unit for deactivating an old primary component carrier according to a presetting or in accordance with a deactivation command sent by a base station.

According to still another aspect of the present application, there is further provided a communication system including the above mentioned base station and terminal.

A further object of the present application is to provide a method and a device for updating a secondary component carrier, and a corresponding base station, terminal and communication system.

Therefore, according to an aspect of the present application, there is provided a method for updating a secondary component carrier in a carrier aggregating communication network, the method including: acquiring status information of a terminal, a base station and/or a secondary component carrier; determining whether the status information meets a predetermined condition; and adding a new secondary component carrier or replacing an old secondary component carrier with a new secondary component carrier in the case that the status information meets the predetermined condition.

According to another aspect of the present application, there is provided a base station in a carrier aggregating communication network, the base station including: a status acquiring unit for acquiring status information of a terminal, a base station and/or a secondary component carrier; a status determining unit for determining whether the status information meets a predetermined condition; and a secondary component carrier updating unit for adding a new secondary component carrier or replacing an old secondary component carrier with a new secondary component carrier in the case that the status information meets the predetermined condition.

According to yet another aspect of the present application, there is provided a terminal adapted for a carrier aggregating communication network, the terminal including: a reconfiguration information receiving unit for receiving "radio resource control" reconfiguration information from a base station; and a radio resource configuring unit for configuring a new secondary component carrier according to radio resource configuration information contained in the "radio resource control" reconfiguration information.

According to still another aspect of the present application, there is further provided a communication system including the above mentioned base station and terminal.

According to the above various embodiments, it is possible to efficiently update the component carrier to be used.

BRIEF DESCRIPTION OF THE DRAWINGS

The above and other objects, characteristics and advantages of the present invention will be more easily understood, with reference to the following description of the embodiments of the present invention made in conjunction with the accompanying drawings. In the drawings, the same or corresponding technical features or components will be denoted by the same or corresponding reference numerals. The drawings together with the following detailed description are contained in the present specification and form a part of the present specification, and are adopted to further illustrate the preferred embodiments of the present invention and explain the principle and advantages of the present invention. In the drawings.

DETAILED DESCRIPTION OF THE INVENTION

Figure 1:
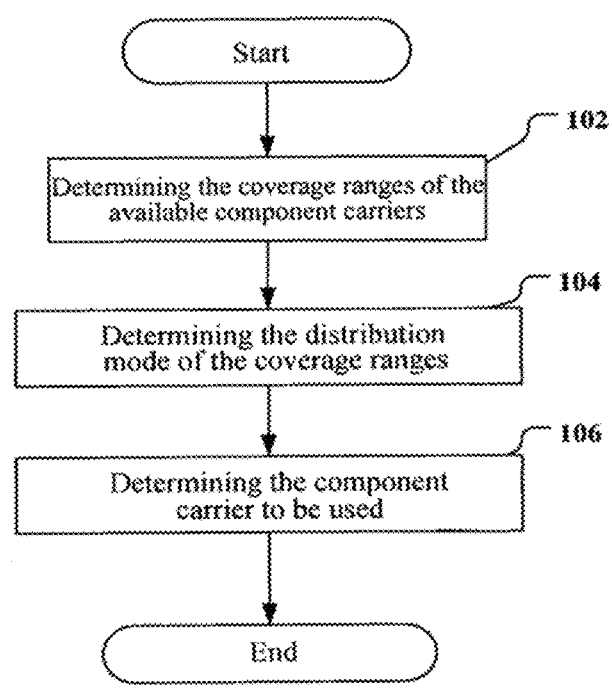
FIG. 1 is a flowchart of a method for selecting a component carrier according to a first embodiment of the present application.

Hereinafter, the exemplary embodiments of the present invention will be described in conjunction with the accompanying drawings. For clarity and conciseness, not all the features of the practical embodiments are described in the specification. However, it is to be understood that many embodiment-specific decisions needs to be made during the development of any of such practical embodiments, so as to achieve the specific object of the developer, for example, in accordance with those limiting conditions related to the system or service, and those limiting conditions may vary with different embodiments. Further, it is also to be understood that the development work may be very complicated and time-consuming, but such development work is only a routine task for those skilled in the art that benefit from the present disclosure.

Further, it is to be noted that only the apparatus configurations and/or processing steps closely related to the solution at least based on the present invention are shown in the drawings, and other details less related to the present invention are omitted, so as to avoid the burring of the present invention due to unnecessary details.

Particularly, when the connecting relations and the information flows are referred to, the depictions in the drawings and the descriptions in the specification only involve the part closely related to the present invention, but not exhaust the depictions or list all the connections and information flows.

Selection of a Component Carrier

First Embodiment

In the present application, a carrier that can be used by a terminal and a base station in a carrier aggregating communication network is referred to be an available carrier. A carrier that a terminal has been using is referred to be a component carrier, which is also an available carrier. The component carrier of a terminal that works in a carrier aggregation mode includes one primary component carrier (PCC), and at least one secondary component carrier (SCC).

In the carrier aggregating communication network, the base station and the terminal can communicate with each other by using carriers located in different frequency bands. For carriers in different frequency bands, a coverage range of a base station antenna usually varies. In view of this, the present application proposes adopting different component carrier selecting strategies for different distribution modes of coverage ranges.

Therefore, as shown in FIG. 1, there is provided a method selecting a component carrier in a carrier aggregating communication network, and the method includes the following steps: determining a coverage range of each available carrier that can be used by a terminal (step 102); determining whether a distribution of the coverage ranges of different available carriers accords with a predetermined distribution mode (step 104); and determining a component carrier to be used at least according to a rule that is decided by the distribution mode, in the case that the distribution of the coverage ranges of different available carriers accords with the predetermined distribution mode (step 106).

The coverage range of each available carrier for a base station is known to the base station. Thus, the coverage range of each available carrier that can be used by a terminal can be obtained based on the position of the terminal. Obviously, a certain available carrier can be used by the terminal means that the terminal is within the coverage range of this available carrier. The position of the terminal can be jointly located by multiple base stations, and can also be determined by the terminal by means of a satellite positioning system, such as the GPS (Global Positioning System), and is supplied to the base station.

As described above, the present application proposes adjusting the component carrier selecting strategy according to the distribution mode of the coverage ranges. The present application assumes three potential application scenes, which are respectively shown in FIGS. 2 to 4, and different component carrier selecting strategies can be adopted in different scenes. Of course, it is also completely possible to consider only one or two of the application scenes, or consider more application scenes and provide more selecting strategies. For conciseness, there are only two available carriers in the examples recited in the present application. However, there may be a plurality of available carriers in practice.

Figure 2:
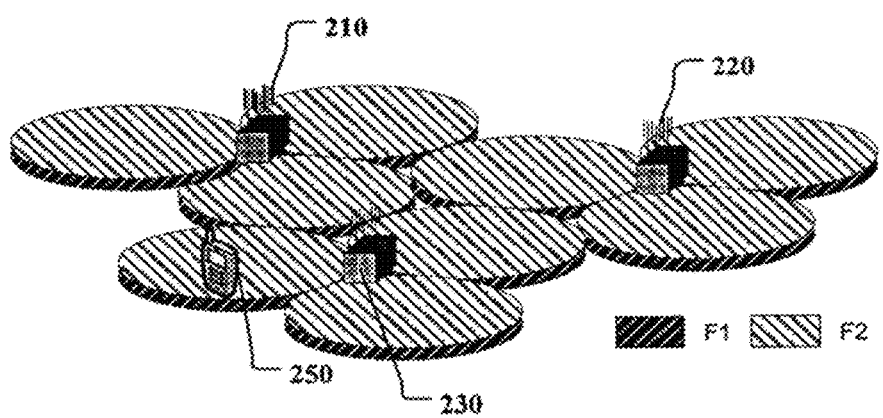
FIG. 2 is a schematic diagram of a first scene to which the method according to the first embodiment of the present application is applied.

The first application scene, that is, the first distribution mode of the coverage ranges of the available carriers, is shown in FIG. 2. In this distribution mode, each of the base stations 210, 220 and 230 respectively uses two carriers F1 and F2, and the cell coverage ranges corresponding to F1 and F2 are substantially coincident with each other and provide substantially identical coverage regions. In this case, F1 and F2 may be within the same carrier frequency band, and it is a kind of typical continuous carrier aggregation.

In this application scene, the terminal 250 is within both of the coverage ranges of the two carriers F1 and F2, as long as the terminal 250 is within the cell coverage range. Thus, in this case, if no other condition is considered, the two carriers F1 and F2 have identical priority, and any one of the carriers F1 and F2 can be selected randomly as a new component carrier; alternatively, one carrier is selected from the two carriers F1 and F2 with other conditions further taken into consideration.

For example, signal quality, interference magnitude, load conditions, and physical resource amount for uplink and physical resource amount for downlink (such as PDCCH (physical downlink control channel)) of each carrier can be used as the basis for selecting the component carrier. Specifically, for a terminal, if it has higher signal quality on a certain carrier, the signal is subjected to less interference on this carrier, this carrier has relatively low load and more uplink and downlink physical resource, the probability that this carrier is selected as the component carrier is relatively higher.

Various factors taken into consideration above can have different priority levels or different weights.

In the case that a priority level is set for each factor, the decision is made based on the factor with a higher priority level. For example, priority levels of any order can be set for the signal quality, the physical resource amount for uplink and physical resource amount for downlink, the interference magnitude and the load conditions. That is, based on the setting of the priority levels, the candidate component carrier can be determined based on any one of the above factors. Alternatively, different priority level groups can be set for the above factors. For example, the priority level of the signal quality and the physical resource amount for uplink and physical resource amount for downlink is higher than that of the interference magnitude and the load conditions; alternatively, an opposite order of priority levels is set, or different priority level groups containing different factors or different number of factors are set. That is, based on the setting of the priority level groups and the priority level order of the priority level groups, the candidate component carrier can be determined solely based on any one group of factors.

A weight (which may be same or different depending on the situation) can be set for each factor, inside each of the above priority level groups, for example, in the group consisting of the signal quality and the physical resource amount for uplink and physical resource amount for downlink.

In the case that different weights are set for different factors, the influence of each factor on the selecting of the component carrier is taken into consideration synthetically. Depending on the requirement in practice, any weight distribution can be set. Generally, the weight of the signal quality and the physical resource amount for uplink and physical resource amount for downlink can be set higher than that of the interference magnitude and the load conditions.

Figure 3:
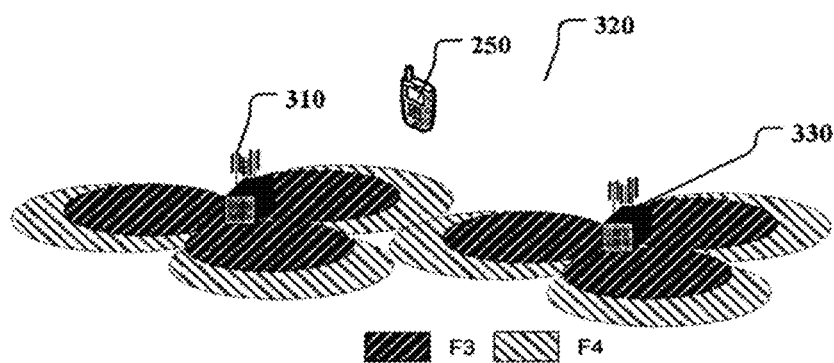
FIG. 3 is a schematic diagram of a second scene to which the method according to the first embodiment of the present application is applied.

In the second application scene, that is, the second distribution mode of the coverage ranges of the available carriers, as shown in FIG. 3, each of the base stations 310, 320 and 330 respectively uses two carriers F3 and F4, and the coverage range of F4 is larger and substantially contains the coverage range of F3. The cell corresponding to F4 mainly ensures the coverage, and the cell corresponding to F3 is mainly used to improve the throughput. In this case, F3 and F4 may be within different carrier frequency bands, and it is a non-continuous carrier aggregation.

In this application scene, when the terminal 250 is only within the coverage range of F4 but not within the coverage range of F3, there is no problem of carrier selection, since there is only one available carrier, i.e., F4. When the terminal 250 is within the coverage ranges of F3 and F4 at the same time, there is a problem of carrier selection. According to an embodiment proposed by the present application, in this case, if no other condition is considered, the carrier with larger coverage range, that is F4, can be selected as the new component carrier. If there are multiple carriers with larger coverage range and the coverage ranges are substantially the same, then the component carrier is further selected in further accordance with the selecting strategy in the first scene, which will be described in more detail hereinafter.

Of course, similar to the first scene, one carrier can be selected with other conditions further taken into consideration.

For example, likewise, the signal quality, the interference magnitude, the load conditions, and the physical resource amount for uplink and physical resource amount for downlink (such as PDCCH, etc.) of each carrier can also be used as the basis for selecting the component carrier. Specifically, for a terminal, if it has higher signal quality on a certain carrier, the signal is subjected to less interference on this carrier, this carrier has relatively low load and more uplink and downlink physical resource, the probability that this carrier is selected as the component carrier is relatively higher.

Various factors taken into consideration above, including the coverage range of each available carrier, can have different priority levels or different weights.

In the case that a priority level is set for each factor, the decision is made based on the factor with a higher priority level. For example, priority levels of any order can be set for the coverage range of the available carrier, the signal quality, the physical resource amount for uplink and physical resource amount for downlink, the interference magnitude and the load conditions. That is, based on the setting of the priority levels, the candidate component carrier can be determined based on any one of the above factors. Alternatively, different priority level groups can be set for the above factors. For example, the priority level of the coverage range is higher than that of the signal quality and the physical resource amount for uplink and physical resource amount for downlink, the priority level of the signal quality and the physical resource amount for uplink and physical resource amount for downlink is higher than that of the interference magnitude and the load conditions; alternatively, an opposite order of priority levels is set, or different priority level groups containing different factors or different number of factors are set. That is, based on the setting of the priority level groups and the priority level order of the priority level groups, the candidate component carrier can be determined solely based on any one group of factors.

A weight (which may be same or different depending on the situation) can be set for each factor, inside each of the above priority level groups, for example, in the group consisting of the signal quality and the physical resource amount for uplink and physical resource amount for downlink.

In the case that different weights are set for different factors, the influence of each factor on the selecting of the component carrier is taken into consideration synthetically. Depending on the requirement in practice, any weight distribution can be set. Generally, the weight of the coverage range can be set higher than that of the signal quality and the physical resource amount for uplink and physical resource amount for downlink, and the weight of the signal quality and the physical resource amount for uplink and physical resource amount for downlink can be set higher than that of the interference magnitude and the load conditions.

Figure 4:
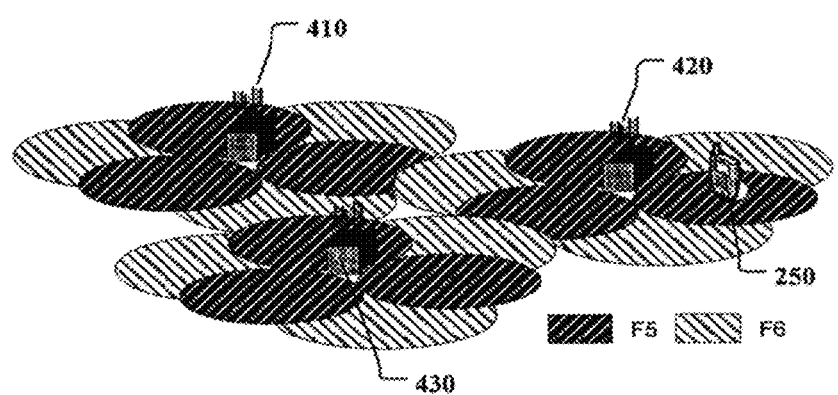
FIG. 4 is a schematic diagram of a third scene to which the method according to the first embodiment of the present application is applied.

In the third application scene, that is, the third distribution mode of the coverage ranges of the available carriers, as shown in FIG. 4, each of the base stations 410, 420 and 430 respectively uses two carriers F5 and F6, and the coverage ranges of the two available carriers are substantially neither coincident with each other nor contained one in the other but overlapped with each other. The cell corresponding to F5 mainly ensures the coverage, and the cell corresponding to F6 is mainly used to improve the throughput (or vice versa). This application scene is characterized in that the antenna of the cell corresponding to F6 is directed to the edge region in the cell corresponding to F5, which will greatly improve the throughput of the edge region in the cell corresponding to F5. In this situation, F5 and F6 may be within different carrier frequency bands, and it is a non-continuous carrier aggregation.

In this application scene, when the terminal 250 is only within the coverage range of F5 or only within the coverage range of F6, there is no problem of carrier selection, since there is only one available carrier, i.e., F5 or F6. When the terminal 250 is within the coverage ranges of F5 and F6 at the same time, that is, in the overlap region of the coverage ranges of the two available carriers, the problem of carrier selection occurs.

According to an embodiment provided by the present application, in this situation, if no other condition is considered, the candidate component carrier can be determined at least according to the position where the terminal is located and the moving direction and moving speed of the terminal.

Figure 5:
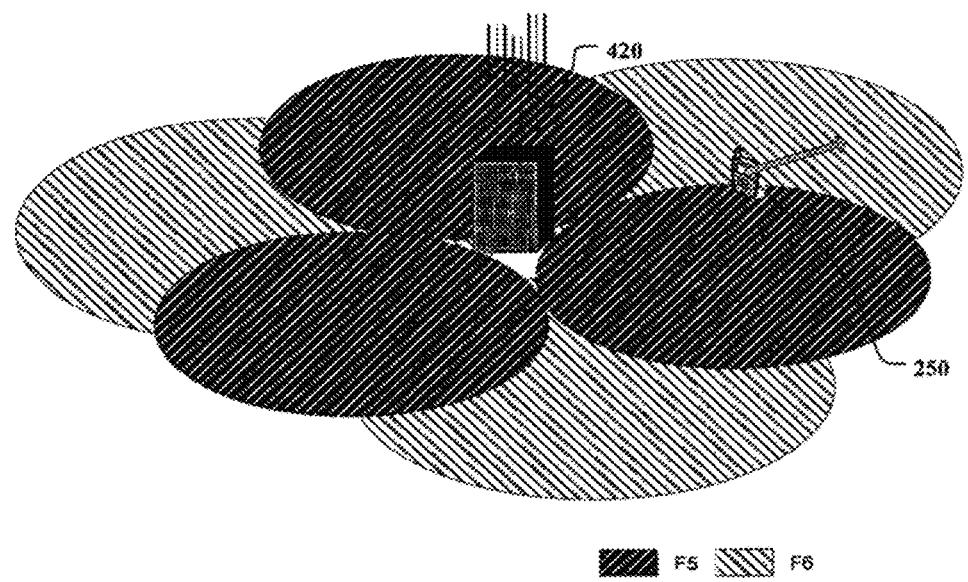
FIGS. 5 to 7 are schematic diagrams of three situations of a position and motion status of a terminal in the third scene shown in FIG. 4.
Figure 6:
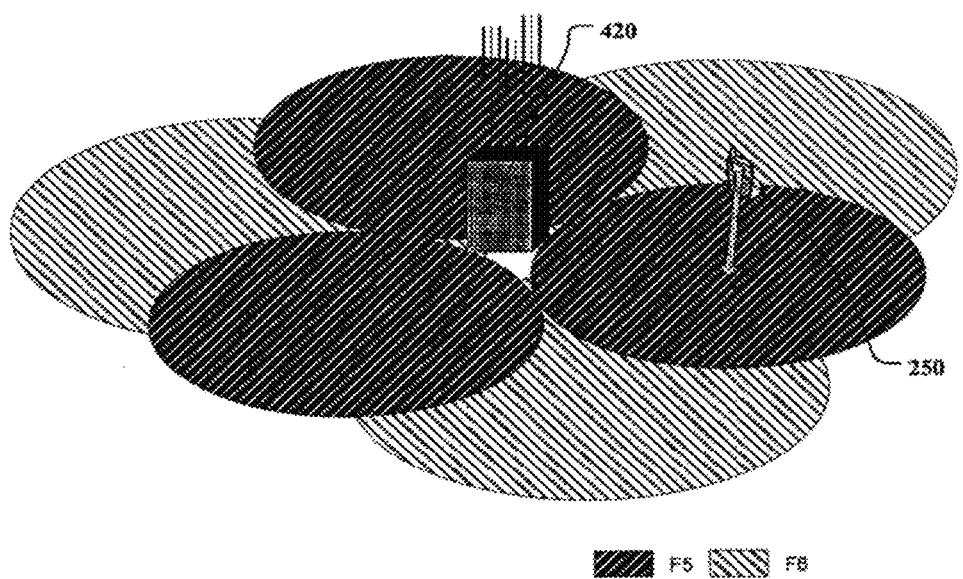
Figure 7:
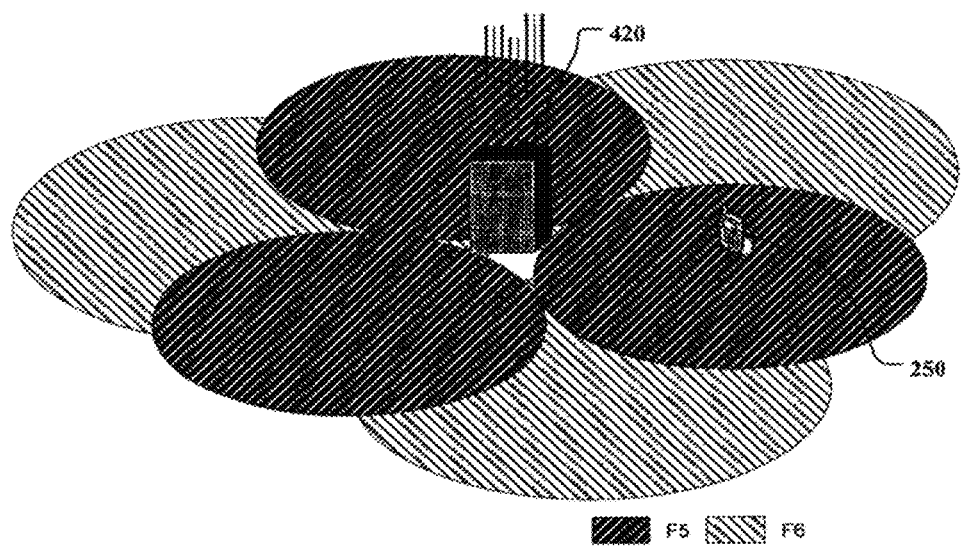

In this application, three modes for the position and motion of the terminal are assumed, as shown in FIG. 5 to FIG. 7. However, it is to be understood that the position and motion of the terminal can be divided in other manners, and the three modes herein can be varied, split or combined as well.

The first mode is shown in FIG. 5, and the terminal 250 is at the edge of the available carrier F5 and is leaving away from this available carrier. In this case, if the terminal is leaving away from this available carrier quickly, a higher probability of becoming the candidate component carrier be assigned to the available carrier (F6 here) corresponding to the leaving direction. Of course, the carrier corresponding to the leaving direction can be directly selected as the candidate component carrier, that is, the probability is 100%. If there are multiple available carriers corresponding to the leaving direction (besides F6, there still exists other available carriers), then the candidate component carrier are selected from the multiple available carriers at least according to the size of the coverage range, that is, similar to the first or second application scene as described above.

Leaving "quickly" is mentioned above. Here, "quickly" means that according to the speed of the terminal, it is predicted that the terminal will be soon out of the carrier coverage range within which the terminal is currently located, but not only move in a small range. For example, if the user of the terminal just walks around in a small range, but may not intend to go out of this carrier coverage range (for example go to another place), unnecessary operations will be induced if the carrier is updated at this time. In the specific application, how high speed is actually meant by "quickly" can be particularly set according to the practical application.

FIG. 6 illustrates another mode for position and motion of the terminal, that is, the terminal 250 is at the edge of a certain available carrier F5 and is moving into this available carrier F5. In this situation, the candidate component carrier can be determined at least according to the size of the coverage ranges of the available carriers F5 and F6, that is, similar to the second application scene. If the coverage ranges are just the same, the selecting strategy in the first scene will be applied.

FIG. 7 illustrates another mode for position and motion of the terminal, that is, the terminal 250 is at a position in the overlap region of the available carriers F5 and F6 but far away from the edge of the overlap region, i.e., within the overlap region. In this situation, the candidate component carrier can also be determined at least according to the size of the coverage ranges of the available carriers F5 and F6, that is, similar to the second application scene. If the coverage ranges are just the same, the selecting strategy in the first scene will be applied.

Of course, similar to the first and second application scenes, one carrier can be selected with other conditions further taken into consideration.

For example, likewise, the signal quality, the interference magnitude, the load conditions, and the physical resource amount for uplink and physical resource amount for downlink (such as PDCCH) of each carrier can also be used as the basis for selecting the component carrier. These factors, including the position where the terminal is located and the moving direction and moving speed of the terminal, and the coverage range of each available carrier, can have different priority levels or different weights.

In the case that a priority level is set for each factor, the decision is made based on the factor with a higher priority level. For example, priority levels of any order can be set for the position of the terminal, the moving direction of the terminal, the moving speed of the terminal, the coverage range of the available carrier, the signal quality, the physical resource amount for uplink and physical resource amount for downlink, the interference magnitude and the load conditions. That is, based on the setting of the priority levels, the candidate component carrier can be determined based on any one of the above factors. Alternatively, different priority level groups can be set for the above factors. For example, the priority level of the position of the terminal, the moving direction of the terminal, the moving speed of the terminal and the coverage range of the available carrier is higher than that of the signal quality and the physical resource amount for uplink and physical resource amount for downlink, and the priority level of the signal quality and the physical resource amount for uplink and physical resource amount for downlink is higher than that of the interference magnitude and the load conditions; alternatively, an opposite order of priority levels is set, or different priority level groups containing different factors or different number of factors are set. That is, based on the setting of the priority level groups and the priority level order of the priority level groups, the component carrier can be selected based solely on any one group of factors.

A weight (which may be same or different depending on the situation) can be set for each factor, inside each of the above priority level groups, for example, in the group consisting of the signal quality and the physical resource amount for uplink and physical resource amount for downlink.

In the case that different weights are set for different factors, the influence of each factor on the selecting of the component carrier is taken into consideration synthetically. Depending on the requirement in practice, any weight distribution can be set. Generally, the weight of the position of the terminal, the moving direction of the terminal, the moving speed of the terminal and the coverage range of the available carrier can be set higher than that of the signal quality and the physical resource amount for uplink and physical resource amount for downlink, and the weight of the signal quality and the physical resource amount for uplink and physical resource amount for downlink can be set higher than that of the interference magnitude and the load conditions.

Second Embodiment

In the first embodiment, the selecting of the component carrier has been described with respect to different application scenes. In the practical application, various application scenes may be mixed, as described in the above. For example, the coverage ranges of each available carrier may be completely coincident with each other (the first application scene), and may have inclusion relation (the second application scene) or partially overlapped with each other (the third application scene).

Figure 8:
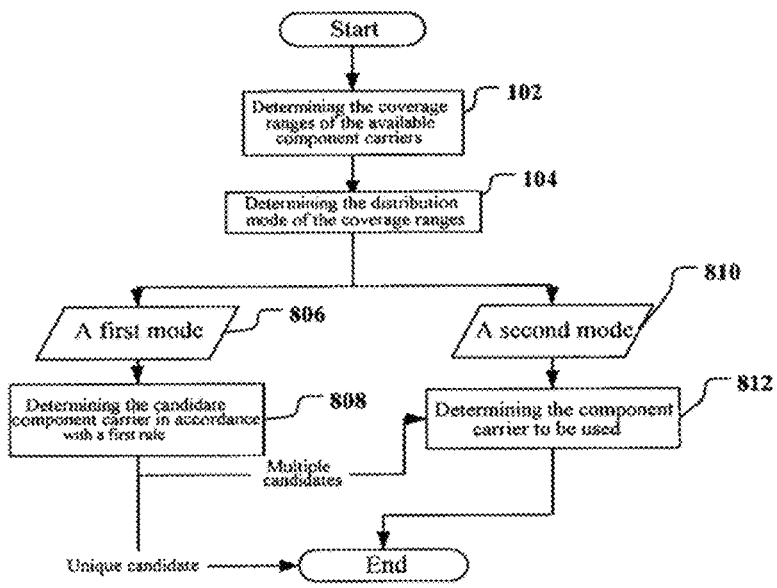
FIG. 8 is a flowchart of a method for selecting a component carrier according to another embodiment of the present application.

Therefore, as shown in FIG. 8, according to an embodiment proposed by the present application, the candidate component carrier are selected by successively using selecting strategies adapted for different application scenes, so as to reduce the scope of the candidate component carriers, until the component carrier to be used is derived. That is, on the basis of the first embodiment, when the distribution of the coverage ranges of different available carriers includes at least two predetermined modes, the candidate component carriers are firstly determined in accordance with the rule corresponding to one of the modes, and then the secondary candidate component carriers are selected from the candidate component carriers in accordance with the rule corresponding to another mode, until a unique candidate component carrier is derived.

Specifically, as shown in FIG. 8, the coverage range of each available carrier that can be used by the terminal is firstly determined (step 102). Then it is determined whether the distribution of the coverage ranges of different available carriers accords with predetermined distribution mode (step 104). The two steps have been described in detail in the first embodiment, which will not be repeated here.

In the case that it is determined that the coverage range has multiple distribution modes, such as the first mode 806 and the second mode 810, the candidate component carriers can be firstly determined in accordance with the first rule corresponding to the first mode (step 808). For example, if the first mode is the third application scene described previously, then the selecting strategy for the component carrier in the third application scene is adopted to select the candidate component carriers. The determined candidate component carrier may be unique, with which the flow is ended, and the determined candidate component carrier is used. The determined candidate component carriers may also be not unique. For example, in the third application scene, if there exist multiple available carriers in the moving direction of the terminal, and the factors in other aspects of each available carrier or the factors taken into consideration in accordance with the selecting strategy are substantially the same, there may be multiple available carriers that can be used as the candidate component carriers. At this time, it is necessary to continue selecting among the multiple candidate component carriers by using the second rule corresponding to the second mode (for example, the selecting strategy corresponding to the first or second application scene) (step 812), so as to derive the component carrier to be used.

FIG. 8 only illustrates the situation with two distribution modes. Obviously, there may be multiple distribution modes, and the application order of the selecting strategies for the various distribution modes can be optional.

Third Embodiment

Further, when the terminal operates in the carrier aggregation mode, besides one primary component carrier, there are still one or more secondary component carriers (SCC) operating at the same time, which are all in the activated status. Meanwhile, it is also possible that there are one or more carriers in configured but in-activated status, and it is also possible that there are one or more carriers in un-configured status.

When it is necessary to change the primary component carrier a new primary component carrier can be selected from the secondary component carriers already in use, and can also be selected from the available carriers that have not been configured yet or that have been configured but not activated yet. When it is necessary to add a secondary component carrier, a new secondary component carrier can be selected from the available carriers that have not been configured, and can also be selected from the available carriers that have been configured but not activated yet.

Obviously, the carriers in different status have different operation complexities when being added. Therefore, on the basis of the first embodiment and the second embodiment the activation and configuration status of each available carrier can be obtained firstly when the component carrier is selected, so as to further take into consideration of the activation and configuration status of each available carrier when the candidate component carrier is determined. Wherein, the priority level of the available carrier in the activated status is higher than that of the available carrier that has been configured but not activated, and the priority level of the available carrier that has been configured but not activated is higher than that of the available carrier that has not been configured.

Here, "higher priority level" means higher weight, or in some situations, for example, in the case that other conditions are the same or similar, it means playing a decisive role.

Fourth Embodiment

The method for selecting the component carrier described in the first to third embodiments can be used to select the primary component carrier.

The carrier corresponding to the cell for the initial access of the terminal, or the carrier used during the connection re-establishing by the terminal, is naturally defaulted as the primary component carrier. However, with variations in the terminal, the base station status and the network conditions, it may be necessary to update the primary component carrier. At this time, a new primary component carrier can be determined by using the method for selecting the component carrier described in the first to third embodiments, and then the old primary component carrier is switched to the new primary component carrier.

The handover from the old primary component carrier to the new primary component carrier can be performed in various manners, and there already exists various manners in the prior art. In the present application, the applicant proposes a new flow for updating the primary component carrier, which will be described in detail in the following embodiments.

The updating of the primary component carrier can be performed several times. In the updating of the primary component carrier for the first time when the terminal initially accesses the cell or after the connection is re-established, the old primary component carrier is the initial primary component carrier, that is, the carrier that is used during the initial access of the terminal or the re-establishing of the radio resource connection, which is defaulted as the primary component carrier.

The carrier aggregation may involve different frequency bands. That is, each carrier that can be used by the terminal may be within the same frequency band, and may be within different frequency bands. Whether the primary component carriers before and after updating are within the same frequency band will affect the overhead required when updating the primary component carrier. Therefore, the frequency relationship between the available carriers can also be taken into consideration for the updating of the primary component carrier.

Specifically, during the updating of the primary component carrier, the frequency spectrum information of each available carrier can be acquired at first, and then the relationship between the frequency of each available carrier and the old primary component carrier is also taken into consideration for determining the candidate component carrier. Among the available carriers with the same activation and configuration status, the available carriers within the same frequency band as the old primary component carrier have higher priority levels. Likewise, "higher priority level" means higher weight, or in some situations, for example, in the case that other conditions are the same or similar, it means playing a decisive role.

Fifth Embodiment

The method for selecting the component carrier described in the first to third embodiments can be used to select the secondary component carrier.

The carrier corresponding to the cell for the initial access of the terminal, or the carrier used during the connection re-establishing by the terminal, is naturally defaulted as the primary component carrier. However, with the increasing requirement on the quality of service by the user, it may be necessary to add a new carrier to form the carrier aggregation.

In this case, at first, a new secondary component carrier can be determined by using the method for selecting the component carrier described in the first to third embodiments, and then the new secondary component carrier is added. The adding of the secondary component carrier can be performed in various manners, and there already exists various manners in the prior art. In the present application, the applicant also proposes a new flow for adding the secondary component carrier, which will be described in detail in the following embodiments.

Sixth Embodiment

In the communication system, the method for selecting the component carrier described in the first to fifth embodiments can be performed by the base station with the assistance of the terminal, and can also be performed by the terminal with the assistance of the base station.

Therefore, in this embodiment, a terminal that is can implement the various embodiments described above is proposed firstly.

In the description of the terminal and the base station in this embodiment and the following various embodiments, unless necessary, the detailed description of the various embodiments described above will not be repeated any more, and reference can be made to the description of the various embodiments described above.

Figure 9:
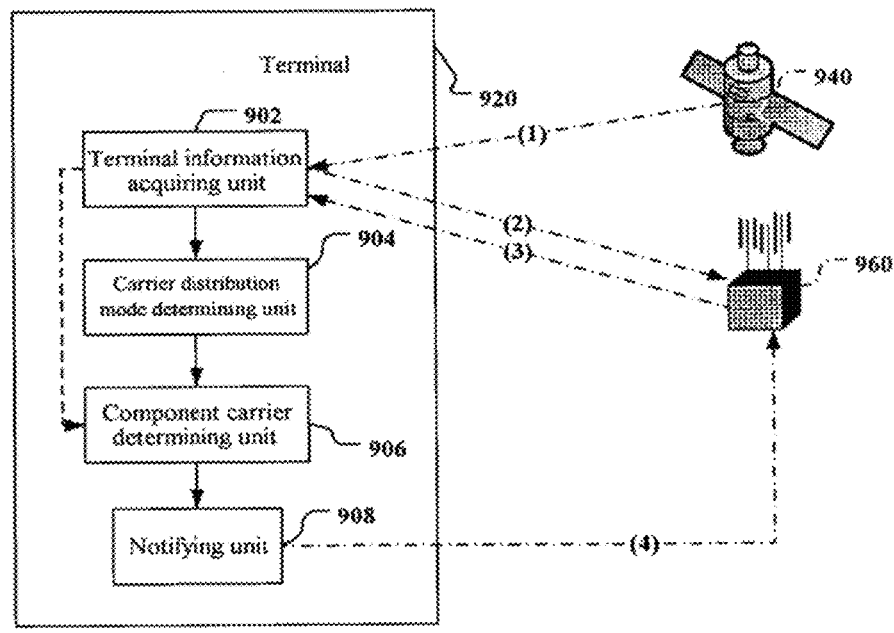
FIG. 9 is a schematic diagram of the structure of a terminal adapted to select a component carrier according to an embodiment of the present application.

As shown in FIG. 9, a terminal 920 adapted for a carrier aggregating communication network communicates with a base station 960, determines the component carrier with the assistance of the base station 960, and notifies the component carrier to the base station 960. Specifically, the terminal 920 includes: a terminal information acquiring unit 902 for acquiring the terminal position information and/or the carrier distribution information corresponding to the terminal position; a carrier distribution mode determining unit 904 for determining whether the distribution of the coverage ranges of different available carriers corresponding to the position of the terminal accords with the predetermined distribution mode; a component carrier determining unit 906 for determining the component carrier to be used at least according to the rule that is decided by the distribution mode in the case that the distribution of the coverage ranges of different available carriers corresponding to the position of the terminal accords with the predetermined distribution mode; and a notifying unit 908 for notifying the component carrier determined to be used to the base station (process (4)).

The object of the terminal information acquiring unit 902 is to acquire the information on the coverage range of the carrier that can be used by the terminal, so that the carrier distribution mode determining unit can determine the distribution mode of the coverage ranges of the available carriers. The information on the coverage range of the available carrier must be determined based on the position of the terminal and the parameter of the carrier of the base station. The position of the terminal can be jointly determined by multiple base stations 960, and can also be determined by the terminal 920 by means of the satellite positioning system 940, such as the GPS (Global Positioning System).

Therefore, in the case of satellite positioning, the terminal information acquiring unit 902 can include a positioning device that is built in the terminal and communicates with the satellite positioning system (process (1)), which positioning device transfers the position of the terminal to the base station 960 (process (2)), and based on the terminal position information, the base station 960 transfers the information on the coverage range of the available carrier to the terminal information acquiring unit 902 (process (3)). In a variation of the embodiment, the terminal 920 can acquire the information on the coverage range of the available carrier without the base station 960. For example, the terminal 902 can determine whether itself is within the coverage range of a certain carrier by detecting the signal intensity of each carrier. In this case, as for the determining of the coverage range of the available carrier, the processes (2) and (3) are not needed.

Further, in the case of base station positioning, since the position of the terminal is obtained by the base station, the base station can obtain the information on the coverage range of the available carrier directly according to this position, so that the terminal information acquiring unit 902 in the terminal can acquire the information from the base station 960 directly (process (3)).

If the carrier distribution mode determining unit 904 determines that the predetermined distribution mode is that the coverage ranges of the available carriers are substantially the same, the component carrier determining unit 906 takes all the available carriers as the candidate component carriers.

If the carrier distribution mode determining unit 904 determines that the predetermined distribution mode is that there exists at least one available carrier the coverage ranges of which is substantially contained within the coverage range of at least one other available carrier, the component carrier determining unit 906 determines the candidate component carrier at least according to the size of the coverage range.

If the carrier distribution mode determining unit 904 determines that the predetermined distribution mode is that there exist at least two available carriers the coverage ranges of which are substantially not coincident with each other nor contained one in the other but overlapped with each other, the terminal information acquiring unit 902 acquires information on the moving direction and moving speed of the terminal, and the component carrier determining unit 906 is further configured to determine the candidate component carrier at least according to the position of the terminal and the moving direction and moving speed thereof.

The moving direction and moving speed of the terminal are determined based on the positions of the terminal at different time instants. As mentioned above, the position of the terminal can be determined by its inbuilt satellite positioning device, and can also be determined by the base station 960. In whatever cases, the moving direction and moving speed of the terminal can be calculated by the terminal information acquiring unit based on the position information obtained from the satellite positioning device or the base station 960. In the case that the position information is obtained from the base station 960, the base station 960 can provide the position information of the terminal to the terminal information acquiring unit by means of the process (3) (which certainly can be other process).

Further, in the case that the position of the terminal is calculated by the base station 960, the calculating of the moving direction and moving speed of the terminal can evidently also be performed by the base station 960. In this situation, the base station 960 only needs to directly provide the position information of the terminal and the information on the moving direction and moving speed of the terminal to the terminal information acquiring unit by means of the process (3) (which certainly can be other process).

Thus, the component carrier determining unit 906 can be further configured so that if the information obtained by the terminal information acquiring unit 902 indicates that the terminal is at the edge of a certain available carrier and is leaving away from this available carrier quickly, then a higher probability of becoming the candidate component carrier is assigned to the available carrier corresponding to the leaving direction; and if the information obtained by the terminal information acquiring unit 902 indicates that the terminal is at the edge of a certain available carrier and is moving towards the interior of this available carrier, or if the terminal is in a position within the overlap region but far away from the edge of the overlap region, then the candidate component carrier can be determined at least according to the size of the coverage range.

The component carrier determining unit 906 can be further configured so that if there are multiple available carriers corresponding to the leaving direction, then the candidate component carrier can be selected from the multiple available carriers at least according to the size of the coverage range.

The component carrier determining unit 906 can be further configured to determine the candidate component carrier at least according to at least one of the following factors: the signal quality, the physical resource amount for uplink and physical resource amount for downlink, the interference magnitude and the load conditions.

Here, the signal quality is the information that can be obtained by the terminal itself in accordance with the conventional techniques, and the interference of other base stations, carriers, terminals or the like on the current terminal is also the information that can be obtained based on the signal quality in accordance with the conventional techniques. The physical resource amount for uplink and physical resource amount for downlink and the load conditions are the information that can be obtained from the base station based on the conventional techniques (see process (5) in FIG. 10). If the interference of the current terminal on other terminals is taken into consideration, it is necessary to acquire the related information from the base station (the base station acquires the information from the report of other terminals).

The component carrier determining unit 906 can be further configured so that for determining the candidate component carrier, the importance of the coverage range, the position of the terminal, and the moving direction and moving speed of the terminal is higher than that of the signal quality and the physical resource amount for uplink and physical resource amount for downlink, and the importance of the signal quality and the physical resource amount for uplink and physical resource amount for downlink is higher than that of the interference magnitude and the load conditions; alternatively, the candidate component carrier can be determined by any one factor or by multiple factors among the coverage range, the position of the terminal and the moving direction and moving speed of the terminal, the signal quality, the physical resource amount for uplink and physical resource amount for downlink, the interference magnitude and the load conditions.

The component carrier determining unit 906 can be further configured so that when the distribution of the coverage ranges of different available carriers includes at least two predetermined modes, the candidate component carriers are firstly determined in accordance with the rule corresponding to one of the modes, and then the secondary candidate component carriers are selected from the candidate component carriers in accordance with the rule corresponding to another mode, until a unique candidate component carrier is derived.

The terminal can further include a carrier status acquiring unit 910 (FIG. 11) for acquiring the activation and configuration status of each available carrier. The component carrier determining unit 906 can be further configured so that the activation and configuration status of each available carrier is also taken into consideration for determining the candidate component carrier. The priority level of the available carrier that is in the activated status is higher than that of the available carrier that has been configured but not activated, and the priority level of the available carrier that has been configured but not activated is higher than that of the available carrier that has not been configured.

Figure 10:
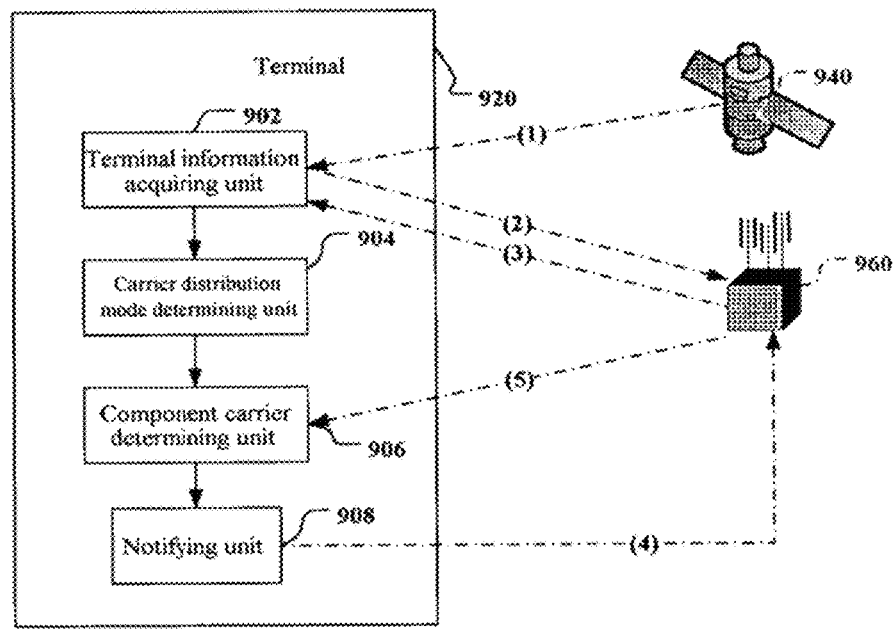
FIG. 10 is a schematic diagram of the structure of a terminal adapted to select a component carrier according to another embodiment of the present application.
Figure 11:
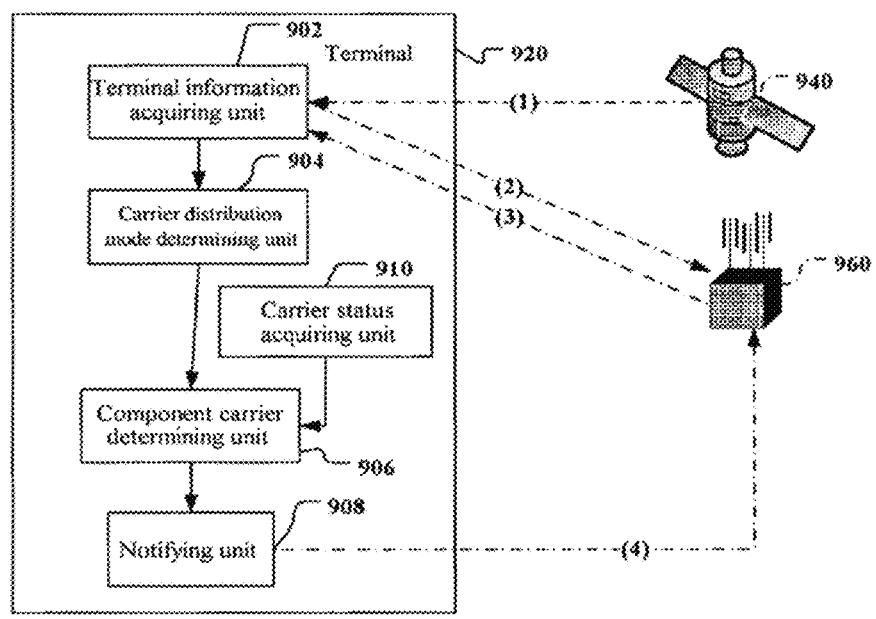
FIG. 11 is a schematic diagram of the structure of a terminal adapted to select a component carrier according to yet another embodiment of the present application.

It is to be noted that the embodiment shown in FIG. 11 does not have the process (5) in FIG. 10. However it can be seen from the above description that in another variation, there can be the process (5) in FIG. 10.

The component carrier determined by the terminal of this embodiment can be the primary component carrier, and can also be the secondary component carrier.

When being used to determine the primary component carrier, the component carrier determining unit 906 can be further configured so that the relationship between the frequency of each available carrier and the old primary component carrier is also taken into consideration for determining the candidate component carrier. Among the available carriers with the same activation and configuration status, the available carriers within the same frequency band as the old primary component carrier have a higher priority level.

The above description of the present embodiment discloses a terminal that interacts with the base station. Obviously, it also discloses a communication system consisting of the above terminal and the base station that communicates with the terminal.

Seventh Embodiment

The sixth embodiment has described the terminal for implementing the method for selecting the component carrier described in the first to fifth embodiments. The seventh embodiment will describe the base station for implementing the method for selecting the component carrier described in the first to fifth embodiments.

In the description of the terminal and the base station in this and the following embodiments, unless necessary, the detailed description of the various embodiments described above will not be repeated any more, and reference can be made to the description of the various embodiments described above.

Figure 12:
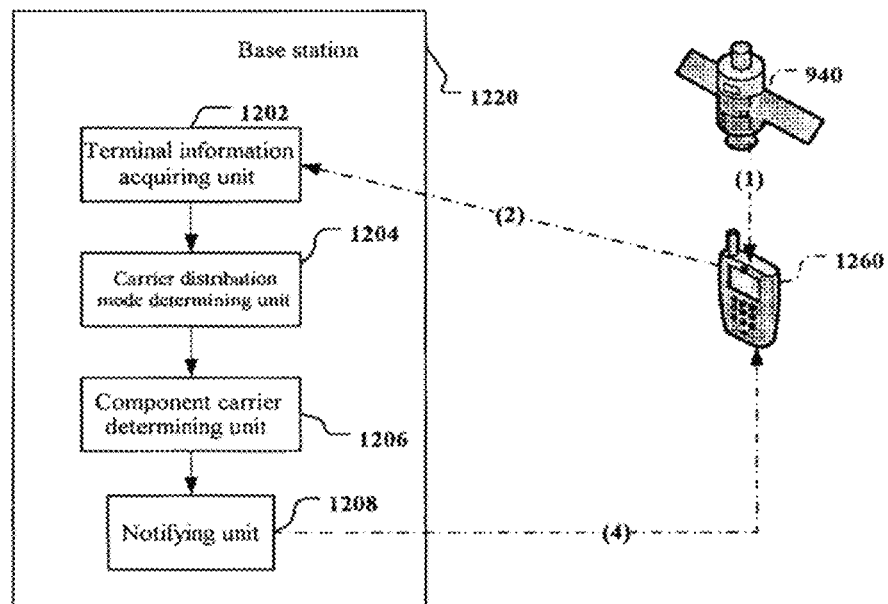
FIG. 12 is a schematic diagram of the structure of a base station adapted to select a component carrier according to an embodiment of the present application.

As shown in FIG. 12, a base station 1220 in a carrier aggregating communication network communicates with a terminal 1260, determines the component carrier with the assistance of the terminal 1260, and notifies the component carrier to the terminal 1260. Specifically, the base station 1220 includes: a terminal information acquiring unit 1202 for acquiring the terminal position information and/or the carrier distribution information corresponding to the terminal position; a carrier distribution mode determining unit 1204 for determining whether the distribution of the coverage ranges of different available carriers corresponding to the position of the terminal accords with the predetermined distribution mode; a component carrier determining unit 1206 for determining the component carrier to be used at least according to the rule that is decided by the distribution mode, in the case that the distribution of the coverage ranges of different available carriers corresponding to the position of the terminal accords with the predetermined distribution mode; and a notifying unit 1208 for notifying the component carrier determined to be used to the terminal (process (4)).

The object of the terminal information acquiring unit 1202 is to acquire the information on the coverage range of the carrier that can be used by the terminal, so that the carrier distribution mode determining unit can determine the distribution mode of the coverage ranges of the available carriers. The information on the coverage range of the available carrier must be determined based on the position of the terminal and the parameter of the carrier of the base station. The position of the terminal can be measured by the base station 1220 itself, and can also be determined by the terminal 1260 by means of the satellite positioning system 940, such as the GPS (Global Positioning System) (process 1).

Therefore, in the case of satellite positioning, the terminal information acquiring unit 1202 can obtain from the terminal 1260 the positioning information of the inbuilt positioning device (process (2)), so as to further obtain the information on the coverage range of the carrier that can be used by the terminal based on the information on the available carrier of the base station.

Further, in the case of base station positioning, since the position of the terminal is obtained by base station, the base station can obtain the information on the coverage range of the available carrier directly according to this position.

If the carrier distribution mode determining unit 1204 determines that the predetermined distribution mode is that the coverage ranges of the available carriers are substantially the same, the component carrier determining unit 1206 takes all the available carriers as the candidate component carriers.

If the carrier distribution mode determining unit 1204 determines that the predetermined distribution mode is that there exists at least one available carrier the coverage range of which is substantially contained within the coverage range of at least one other available carrier, the component carrier determining unit 1206 determines the candidate component carrier at least according to the size of the coverage range.

If the carrier distribution mode determining unit 1204 determines that the predetermined distribution mode is that there exist at least two a available carriers the coverage ranges of which are substantially not coincident with each other nor contained one in the other but overlapped with each other, the terminal information acquiring unit 1202 acquires the information on the moving direction and moving speed of the terminal, and the component carrier determining unit 1206 is further configured to determine the candidate component carrier at least according to the position of the terminal and the moving direction and moving speed thereof.

The moving direction and moving speed of the terminal are determined based on the positions of the terminal at different time instants. As mentioned above, the positions of the terminal can be determined by its inbuilt satellite positioning device, and can also be determined by the base station 1220. In whatever cases, the moving direction and moving speed of the terminal can be calculated by the terminal information acquiring unit based on the position information obtained from the terminal 1260 or the position of the terminal calculated by the base station.

Further, in the case that the position of the terminal is obtained by the terminal 1260 by means of the satellite positioning device, the calculating of the moving direction and moving speed of the terminal can certainly also be performed by the terminal itself. In this situation, the terminal 1260 only needs to directly provide the position information of the terminal and the information on the moving direction and moving speed of the terminal to the terminal information acquiring unit 1202 by means of the process (2) (which of course can be other process).

Thus, the component carrier determining unit 1206 can be further configured so that if the information obtained by the terminal information acquiring unit 1202 indicates that the terminal is at the edge of a certain available carrier and is leaving away from this available carrier quickly, then a higher probability of becoming the candidate component carrier is assigned to the available carrier corresponding to the leaving direction; and if the information obtained by the terminal information acquiring unit 1202 indicates that the terminal is at the edge of a certain available carrier and is moving towards the interior of this available carrier, or if the terminal is in a position within the overlap region but far away from the edge of the overlap region, then the candidate component carrier can be determined at least according to the size of the coverage range.

The component carrier determining unit 1206 can be further configured so that if there are multiple available carriers corresponding to the leaving direction, then the candidate component carrier can be selected from the multiple available carriers at least according to the size of the coverage range.

The component carrier determining unit 1206 can be further configured to determine the candidate component carrier at least according to at least one of the following factors: the signal quality, the physical resource amount for uplink and physical resource amount for downlink, the interference magnitude and the load conditions.

Here, the signal quality is the information that can be obtained by the terminal itself in accordance with the conventional techniques, and the interference of other base stations, carriers, terminals or the like on the current terminal is also the information that can be obtained by the terminal based on the signal quality in accordance with the conventional techniques. The physical resource amount for uplink and physical resource amount for downlink and the load conditions are the information that can be held by the base station itself based on the conventional techniques. If the interference of the current terminal on other terminals is taken into consideration, the related information is obtained by the base station based on the information reported by other terminals. Therefore, the component carrier determining unit 1206 obtains the related information from the terminal 1260 as required (see process (5) in FIG. 13).

The component carrier determining unit 1206 can be further configured so that for determining the candidate component carrier, the importance of the coverage range, the position of the terminal, and the moving direction and moving speed of the terminal is higher than that of the signal quality and the physical resource amount for uplink and physical resource amount for downlink, and the importance of the signal quality and the physical resource amount for uplink and physical resource amount for downlink is higher than that of the interference magnitude and the load conditions; alternatively, the candidate component carrier can be determined by any one factor or by multiple factors among the coverage range, the position of the terminal and the moving direction and moving speed of the terminal, the signal quality, the physical resource amount for uplink and physical resource amount for downlink, the interference magnitude and the load conditions.

The component carrier determining unit 1206 can be further configured so that when the distribution of the coverage ranges of different available carriers includes at least two predetermined modes, the candidate component carriers are firstly determined in accordance with the rule corresponding to one of the modes, and then the secondary candidate component carriers are selected from the candidate component carriers in accordance with the rule corresponding to another mode, until a unique candidate component carrier is derived.

The base station can further include a carrier status acquiring unit 1210 for acquiring the activation and configuration status of each available carrier. The component carrier determining unit 1206 can be further configured so that the activation and configuration status of each available carrier is also taken into consideration for determining the candidate component carrier. The priority level of the available carriers in the activated status is higher than that of the available carriers configured but not activated, and the priority level of the available carrier configured but not activated is higher than that of the available carrier that has not been configured. Here, the activation and configuration status of the available carrier is the status of the terminal itself, thus the base station of this embodiment needs to obtain from the terminal 1260 the activation and configuration status information of the available carrier of this terminal through the process (6) (FIG. 14).

Figure 13:
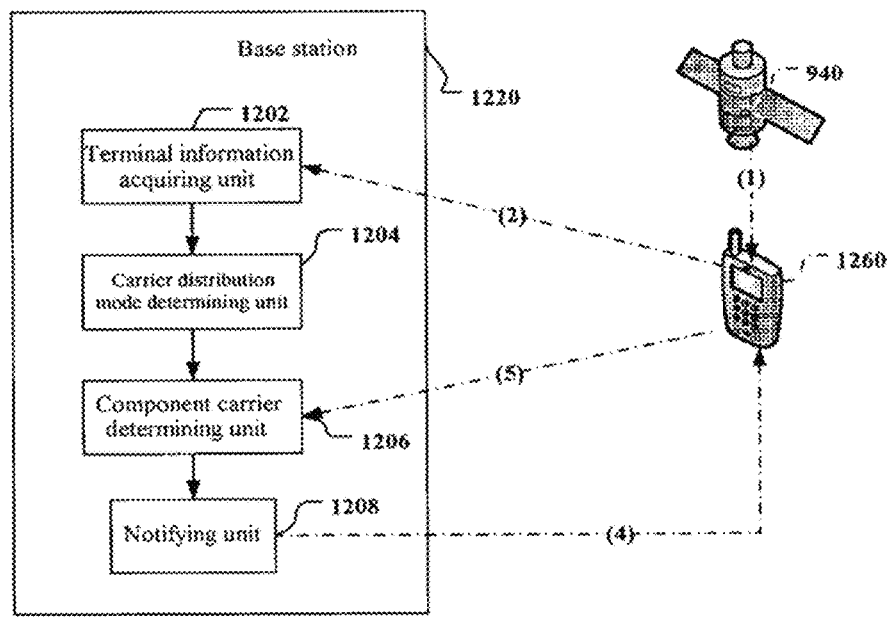
FIG. 13 is a schematic diagram of the structure of abase station adapted to select a component carrier according to another embodiment of the present application.
Figure 14:
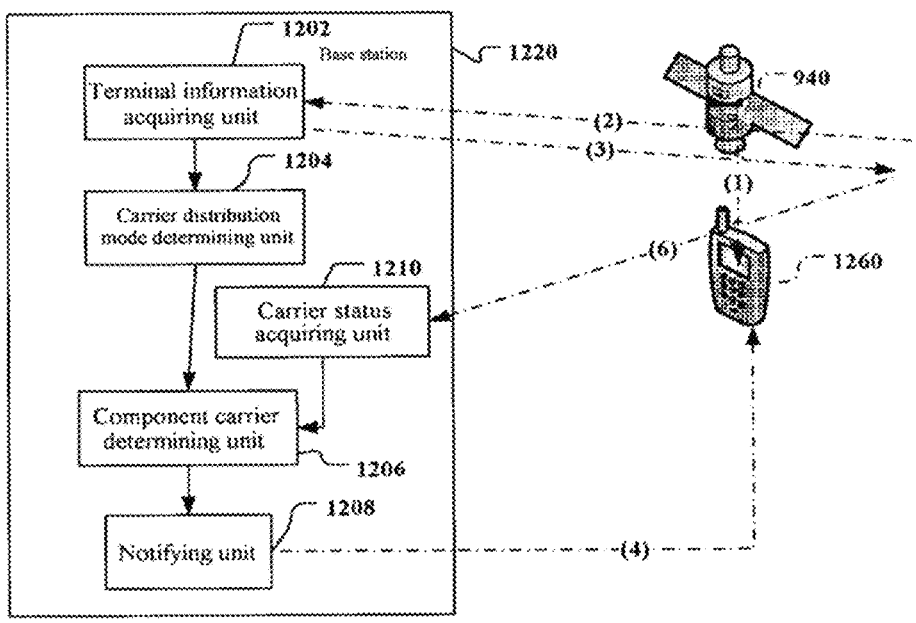
FIG. 14 is a schematic diagram of the structure of a base station adapted to select a component carrier according to yet another embodiment of the present application.

It is to be noted that the embodiment shown in FIG. 14 does not have the process (5) in FIG. 13. However, it can be seen from the above description that in another variation, there can be the process (5) in FIG. 13.

The component carrier determined by the base station of this embodiment can be the primary component carrier, and can also be the secondary component carrier.

When being used to determine the primary component carrier, the component carrier determining unit 1206 can be further configured so that the relationship between the frequency of each available carrier and the old primary component carrier is also taken into consideration for determining the candidate component carrier. Among the available carriers with the same activation and configuration status, the available carriers within the same frequency band as the old primary component carrier have a higher priority level.

The above description of the present embodiment discloses a base station that interacts with the terminal. Obviously, it also discloses a communication system consisting of the above base station and the terminal that communicates with the base station.

Updating of a Component Carrier

Eighth Embodiment

The above embodiments have described how to select a component carrier, including the primary component carrier and the secondary component carrier.

After the component carrier is selected, it is necessary to switch from the old primary component carrier to the selected new primary component carrier by using a suitable flow, or add the selected new secondary component carrier, or replace a certain old secondary component carrier with the selected new secondary component carrier (actually the combination of an adding action and a deleting action). Further, it is also necessary to appropriately determine the opportunity for updating or adding the component carrier.

Figure 15:
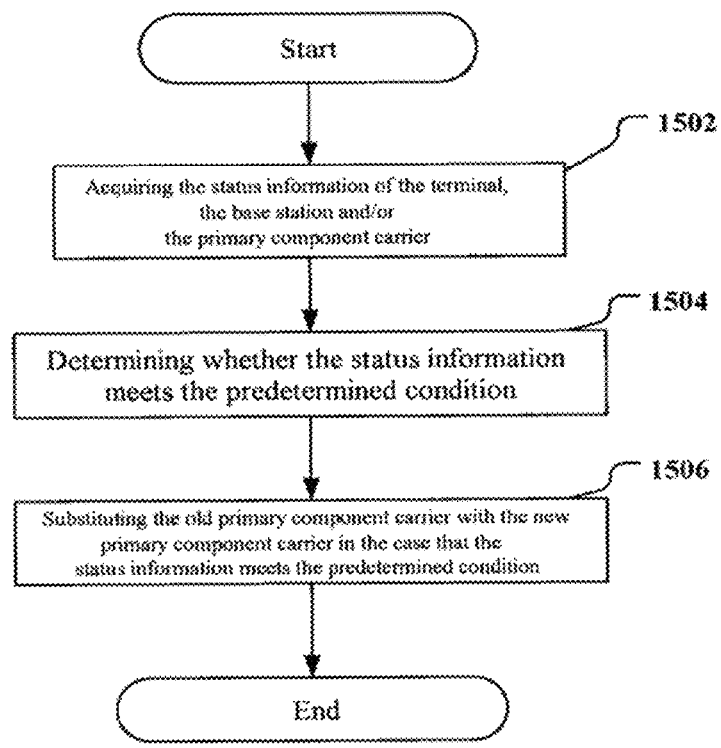
FIG. 15 is a flowchart of a method for updating a primary component carrier according to an embodiment of the present application.

Therefore, as shown in FIG. 15, in this embodiment, there is proposed a method for updating the primary component carrier in the carrier aggregating communication network, and the method includes the following steps: acquiring the status information of the terminal, the base station and/or the primary component carrier (step 1502); determining whether the status information meets the predetermined condition (step 1504); and replacing the old primary component carrier with the new primary component carrier in the case that the status information meets the predetermined condition (step 1506).

In the prior art, there may be various parameters for representing the terminal, the base station, the performance and status of the component carrier in use and the carrier that can be used by the base station, and the like. The related information can be obtained by various measurement or communication means. For such information, various predetermined conditions can be set according to the requirement in the practical application, and the primary component carrier will be updated when the predetermined condition is satisfied.

As an illustrative example but not the restrictive enumeration, the conditions taken into consideration for updating the primary component carrier can include at least one of the following:

1. The terminal moves out of the coverage range of the old primary component carrier;
2. The signal quality of the old primary component carrier is degraded;
3. The physical resource amount for uplink and physical resource amount for downlink of the old primary component carrier is not enough;
4. The original base station requires to update the primary component carrier considering problems such as the balance of the overall load of the network and the interference between the users; and
5. The terminal moves into the coverage range of the new base station.

Figure 16:
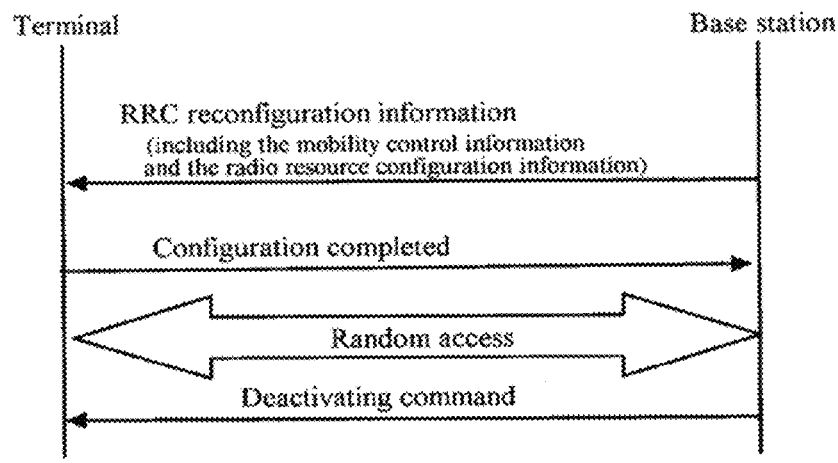
FIG. 16 is a schematic diagram of a handover flow in the method for updating a primary component carrier.

The updating of the primary component carrier can be implemented by using the handover flow, and can also be implemented by using the reconfiguring flow. As shown in FIG. 16, in the handover flow, the base station which the old primary component carrier belongs to transmits "radio resource control (RRC)" reconfiguration information to the terminal. The "radio resource control" reconfiguration information includes mobility control information which includes radio resource configuration information of the new primary component carrier. Then, the terminal reconfigures MAC (Medium Access Control), PDCP (Packet Data Convergence Protocol) and RLC (Radio Link Control) layers and updates the security key by using the mobility control information in the "radio resource control" reconfiguration information, and configures the new primary component carrier by using the radio resource configuration information of the new primary component carrier.

Then a random access process is initiated, for accessing the new primary component carrier. The random access process can be initiated by the terminal, or initiated by the base station. If the random access process is initiated by the terminal, the random access process is a competitive process, in which the access request is made by the terminal and the base station the new primary component carrier belongs to performs the assignation according to the resource and the access requests from other terminals, that is, the random access is a process during which the terminals grab the resource. If the random access is unsuccessful, it may be retried as required, or it is necessary to reconfigure the radio resource configuration information, or it is necessary to re-switch. If the random access process is initiated by the base station the new primary component carrier belongs to, then the base station has already reserved corresponding resource for the terminal in advance. Therefore, the terminal only needs to respond to this, unless the situation at the side of the terminal changes. Such random access is referred to be a non-competitive random access.

After the new primary component carrier is accessed, the old primary component carrier can be deactivated. The deactivating can be performed in two manners. One manner is that the base station the new primary component carrier belongs to directly transmits a deactivating command to the terminal (as shown in FIG. 16), and the terminal deactivates the old primary component carrier after receiving the deactivating command. The other manner is to deactivate the old primary component carrier in an implicit deactivating manner (not shown in FIG. 16), that is, the terminal does not need to receive the deactivating command from the base station, but auto-deactivates the old primary component carrier. Such automatic action can be for example performed based on a timer, that is, the system defines in advance the time for deactivating the old primary component carrier, or defines in advance the trigger condition for the deactivating timer.

It is to be noted that "the base station the new primary component carrier belongs to" and "the base station the old primary component carrier belongs to" are mentioned here. When the new and old primary component carriers belong to the same base station, the above two terms refer to the same base station.

Figure 18:
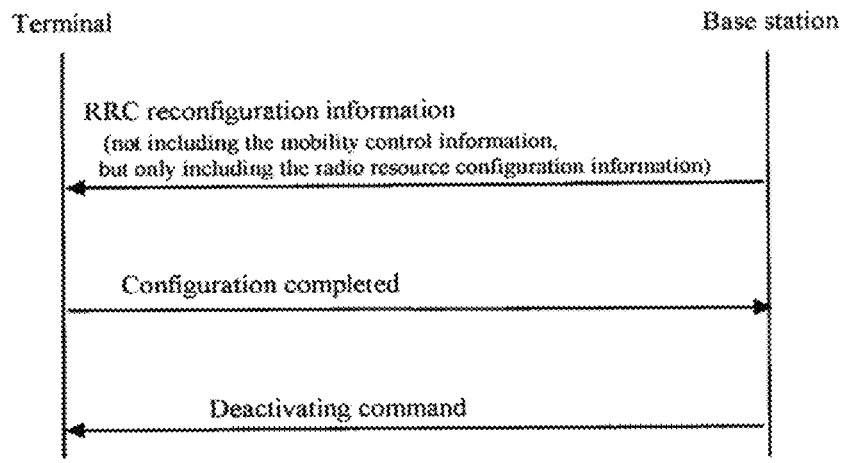
FIG. 18 is a schematic diagram of a reconfiguring flow in the method for updating a primary component carrier.

As described above, the updating of the primary component carrier can also be performed by using the reconfiguring flow. As shown in FIG. 18, as compared with the handover flow, the reconfiguring flow can be free of random access process and key updating process. Further, the content of the RRC reconfiguration information is simplified, not including the mobility control information but only including the radio resource configuration information of the new primary component carrier. Therefore, after receiving the RRC reconfiguration information, the terminal only needs to configure the new primary component carrier, but does not need to reconfigure the MAC, PDCP, RLC layers and update the security key. Therefore, the additional system overhead caused by the updating of the primary component carrier can be reduced, and the problem of lowered quality of service for the user due to the updating of the primary component carrier can be avoided. In this situation, it is unnecessary to include all the related configuration information of the new primary component carrier in the RRC information body (for example, not including the mobility control information), and it is necessary to include only the configuration information that is updated compared with the old primary component carrier, i.e., the radio resource configuration information, which can be referred as increment signaling.

Ninth Embodiment

Obviously, the updating of all the primary component carriers can be performed in the handover manner. However, not all the updating of the primary component carriers can be performed in the reconfiguring manner. This is because that only if the new and old primary component carriers have the same security key and it is unnecessary to reconfigure the MAC, PDCP and RLC layers, it is possible to use the reconfiguring flow.

Therefore, the present application continues to propose that the flow for updating is decided according to the updating scene. It the primary component carriers before and after the updating belong to the same base station, the primary component carrier is updated by using the reconfiguring flow. If the primary component carriers before and after the updating belong to the different base stations, the primary component carrier is updated by using the handover flow.

Figure 17:
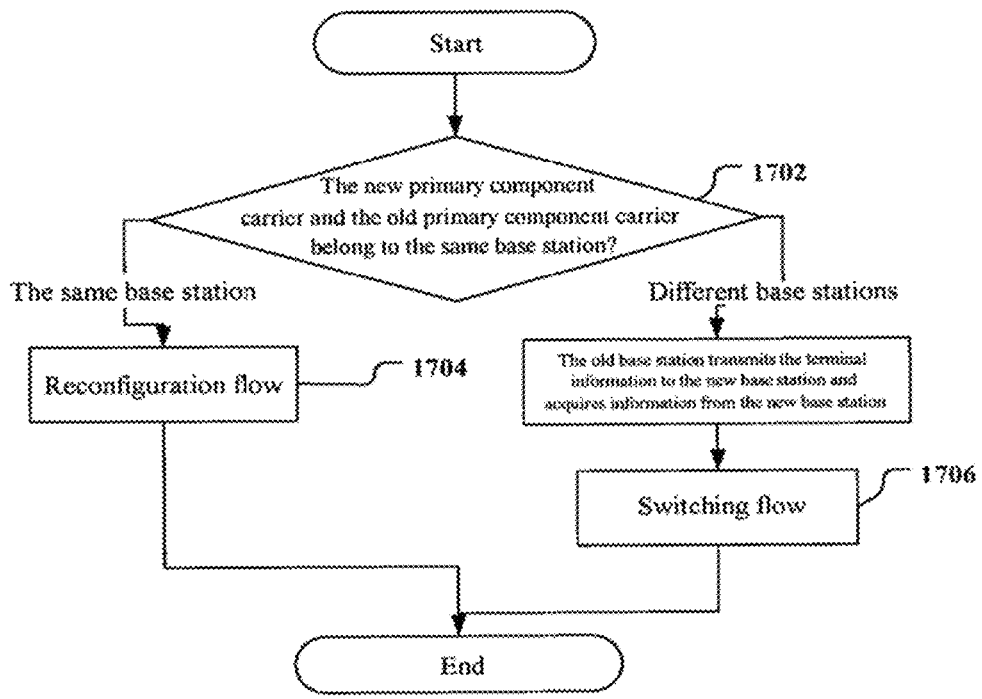
FIG. 17 is a flowchart of a method for updating a primary component carrier according to another embodiment of the present application.

Specifically, as shown in FIG. 17, the flow for updating the primary component carrier includes: determining whether the new primary component carrier and the old primary component carrier belong to the same base station (step 1702); replacing the old primary component carrier with the new primary component carrier by this base station by using the reconfiguring flow, if the new primary component carrier and the old primary component carrier belong to the same base station (step 1704); otherwise, transmitting a handover request to the base station the new primary component carrier belongs to by the base station the old primary component carrier belongs to, for acquiring the related information from the base station the new primary component carrier belongs to (step 1704), and then replacing the old primary component carrier with the new primary component carrier by using the handover flow (step 1706).

Specifically, in step 1704, the base station the old primary component carrier belongs to (referred as the old base station for short hereinafter) transmits the handover request to the base station the new primary component carrier belongs to (referred as the new base station for short hereinafter), so that the new base station can prepare the configuration information required for handover of the terminal to the new primary component carrier, and thus the old base station can obtain the necessary configuration information from the new base station, so that the old base station can prepare during the handover flow the RRC reconfiguration information to be sent to the terminal.

The reconfiguring flow 1704 and the handover flow 1706 in this embodiment are the same as those described in conjunction with FIG. 16 and FIG. 18 hereinbefore. The slight difference is that since the new and old primary component carriers belong to different base stations, although the RRC reconfiguration information is still sent by the old base station, the random access process alter the configuration is completed is the interaction with the new base station (which is described in detail in conjunction with FIG. 31 hereinafter). The response (or confirmation) message after the terminal completes the configuration is also sent to the new base station directly.

By comparing the eighth embodiment with the ninth embodiment, it can be seen that because it is necessary to reconfigure the MAC, PDCP, and RLC layers and update the security key during the handover process, the system overhead will be increased and the phenomenon of communication interrupt will occur inevitably. If the reconfiguring flow is adopted, the system overhead will be reduced significantly, and time length of the communication interrupt is decreased. Thus, the method proposed by the ninth embodiment, in which whether the handover flow or the reconfiguring flow is used to update the primary component carrier is determined according to whether the primary component carriers before and after the updating belong to the same base station, can reduce the additional system overhead due to the updating of the primary component carrier, and avoid the problems such as the degraded quality of service for the user due to the updating of the primary component carrier.

Figure 19:
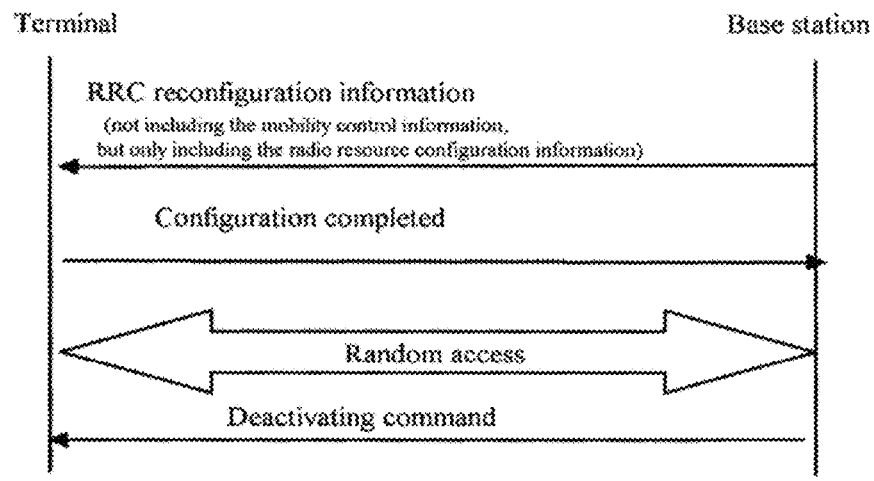
FIG. 19 is a schematic diagram of a variation of the reconfiguring flow.

In the above reconfiguring flow, the new primary component carrier and the old primary component carrier are generally within the same frequency band, have the same time advance and both keep synchronous with the base station. If such conditions are not satisfied, it is necessary to initiate the random access of the new primary component carrier before the old primary component carrier is deactivated, as shown in FIG. 19.

Tenth Embodiment

In the eighth and ninth embodiments, the implicit premise is that the new primary component carrier has been initially configured and activated. However, in practice, there also exists the scene in which the new primary component carrier has not been initially configured, or has been initially configured but not activated.

Figure 20:
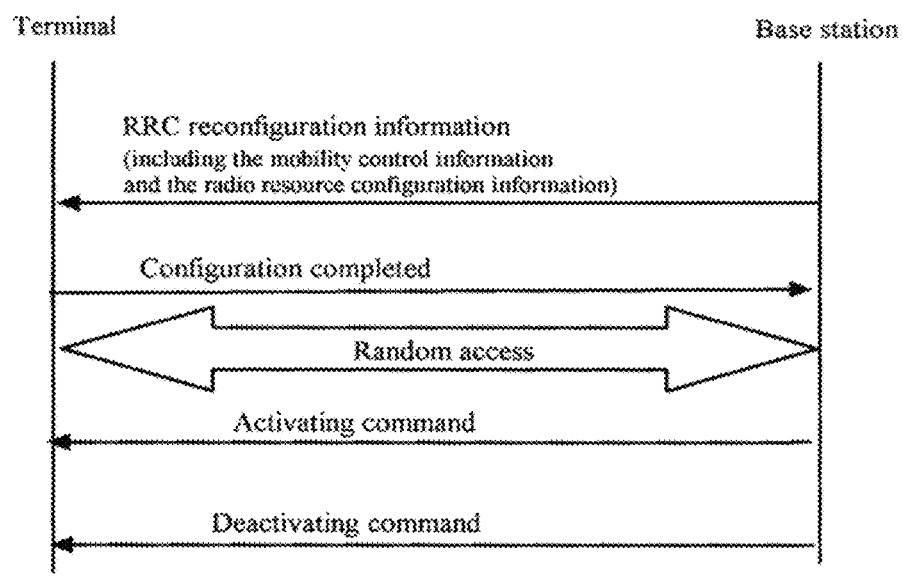
FIGS. 20, 21 and 22 are schematic diagrams of a variation of the flow shown in FIGS. 16, 18 and 19, respectively.
Figure 21:
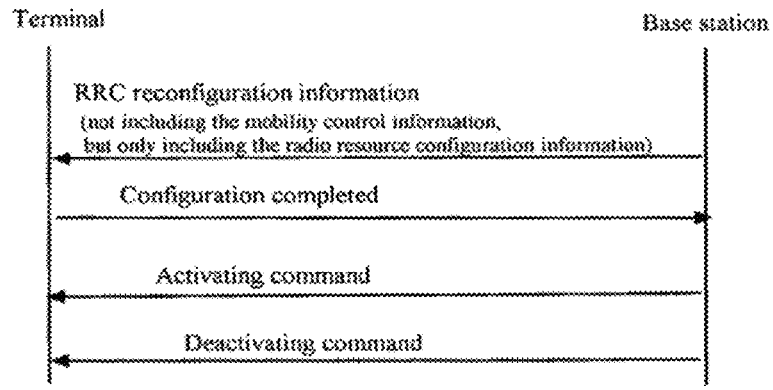
Figure 22:
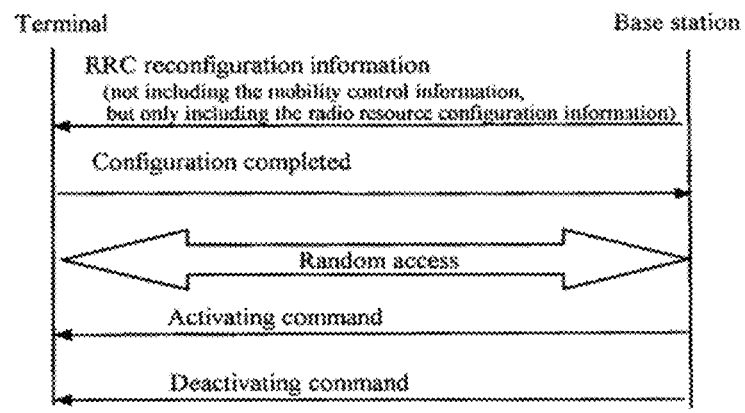
Figure 23:
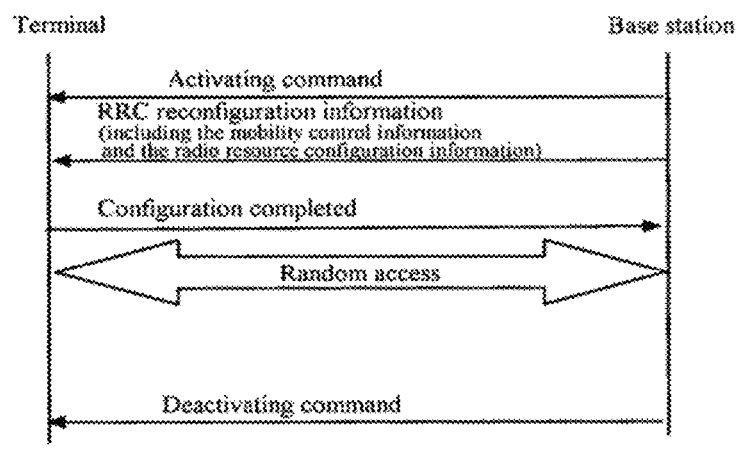
FIGS. 23, 24 and 25 are schematic diagrams of another variation of the flow shown in FIGS. 16, 18 and 19, respectively.
Figure 24:
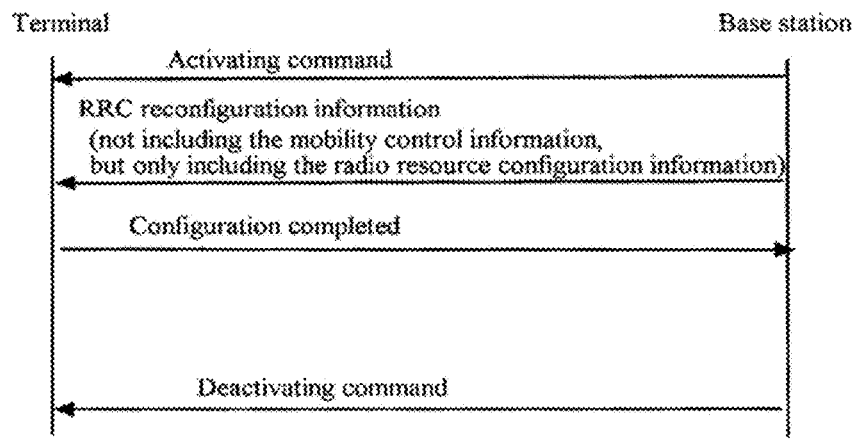
Figure 25:
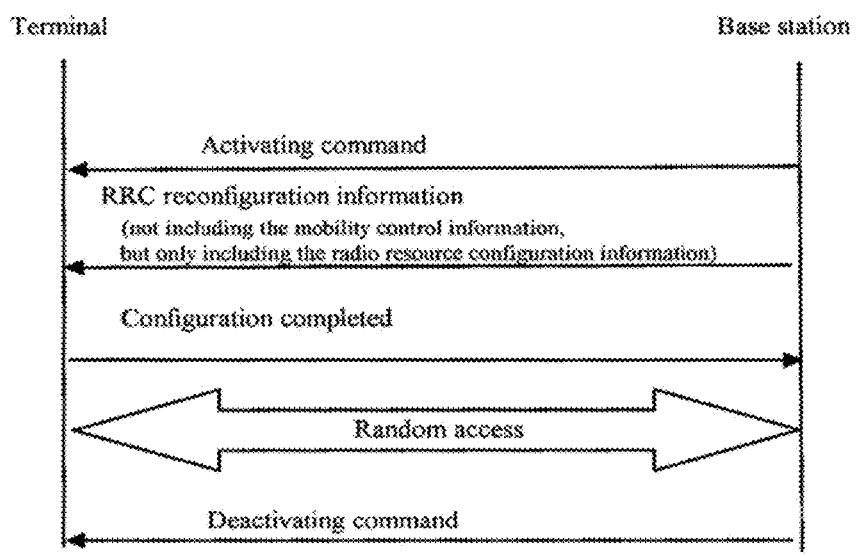

In this scene, no doubt, it is necessary to initially configure and activate the carrier to be used as the new primary component carrier which has not been initially configured yet, and to activate the carrier to be used as the new primary component carrier which has been initially configured but not activated yet. The initial configuration (i.e., the adding of this carrier) should be performed at the beginning of the handover flow or the reconfiguring flow (not shown in the Figures), but the activation process is relatively flexible in terms of time order. As shown in FIGS. 20 to 22 corresponding to FIGS. 16, 18 and 19, during the activation process, the activating command can be sent by the base station after the configuration is completed or after the random access process, or before the old primary component carrier is deactivated (as shown in the Figures, the base station transmits the deactivating command, but as described above, the deactivation process can also be the implicit deactivating by the terminal itself). Alternatively, as shown in FIGS. 23 to 25 corresponding to FIGS. 16, 18 and 19, during the activation process, the activating command can also be sent by the base station before the RRC reconfiguration information is sent.

Further, the activating command can be combined or sent simultaneously with other commands. For example, if the new primary component carrier is in the status in which it is not initially configured, the initial configuration and activation processes can be combined to be defined as a new "configuring and activating" process to perform the configuration and activation simultaneously, that is, the base station transmits a "configuring and activating" command. The terminal performs the configuration and activation simultaneously after receiving this command. Further, the activating command can be sent together with the "radio resource control" reconfiguration information.

In another embodiment, the initial configuring flow and the following handover flow or reconfiguring flow can be combined to be contained in one command to be performed, but not separated. That is, the initial configuring command can be combined with the RRC reconfiguration information.

Eleventh Embodiment

The updating of the secondary component carrier will be described in the following. As described above, the updating of the secondary component carrier includes adding the selected new secondary component carrier, or replacing a certain old secondary component carrier with the selected new secondary component carrier. The latter situation is in fact the combination of the adding action and the deleting action. Similar to the consideration in the eighth embodiment, this embodiment proposes a method for updating the secondary component carrier, for properly determining the opportunity for updating or adding the component carrier.

Figure 26:
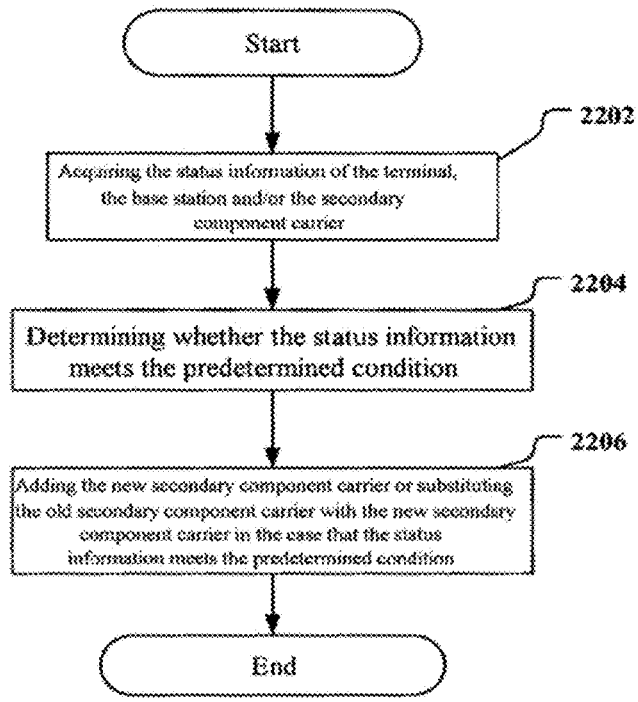
FIG. 26 is a flowchart of a method for updating a secondary component carrier according to an embodiment of the present application.

As shown in FIG. 26, the method of this embodiment includes the following steps: acquiring the status information of the terminal, the base station and/or the secondary component carrier (step 2202); determining whether the status information meets the predetermined condition (step 2204); and adding the new secondary component carrier or replacing the old secondary component carrier with the new secondary component carrier in the case that the status information meets the predetermined condition (step 2206).

In the prior art, there exists various parameters for representing the terminal, the base station, and the performance and status of the component carrier in use or the carrier that can be used by the base station, and the like, and the related information can be obtained by various measurement or communication means. For such information, various predetermined conditions can be set depending on the requirement in the practical application, and the secondary component carrier will be updated when the predetermined condition is satisfied.

As an illustrative example but not the restrictive enumeration, the conditions taken into consideration for updating the secondary component carrier can include at least one of the following:

1. More secondary component carriers are needed due to the requirement of service;
2. The terminal moves out of the coverage range of the old secondary component carrier;
3. The signal quality of the old secondary component carrier is degraded;
4. The physical resource amount for uplink and physical resource amount for downlink of the old secondary component carrier is not enough;
5. The original base station requires to update the secondary component carrier considering problems such as the balance of the overall load of the network and the interference between the users; and
6. The terminal moves into the coverage range of the new base station.

The updating of the secondary component carrier can be implemented by using the reconfiguring flow. This reconfiguring flow is similar to the reconfiguring flow for the primary component carrier described in conjunction with FIG. 18. The difference is that since the secondary component carrier is not unique, the essence of the updating of the secondary component carrier is to add the new secondary component carrier, as described above, and therefore, the reconfiguring flow for the updating of the secondary component carrier does not need to include the deactivating process.

Specifically, in the reconfiguring flow, the base station transmits "radio resource control (RRC)" reconfiguration information to the terminal. The "radio resource control" reconfiguration information includes only radio resource configuration information of the new secondary component carrier. Then the terminal configures the new secondary component carrier by using the radio resource configuration information of the new primary component carrier. Because it is unnecessary to reconfigure the MAC, PDCP and RLC layers or update the security key, the additional system overhead caused by the updating of the secondary component carrier is reduced, and the problem of the degraded quality of service for the user caused by the updating of the secondary component carrier is avoided. In this situation, it is unnecessary to include all the related configuration information of the new secondary component carrier in the RRC information body (for example, not including the mobility control information), and it is necessary to include only the radio resource configuration information of the secondary component carrier, which is referred as increment signaling.

Likewise, similar to the tenth embodiment, in practice, there also exists the scene in which the new secondary component carrier has not been initially configured, or has been initially configured but not activated.

Figure 27:
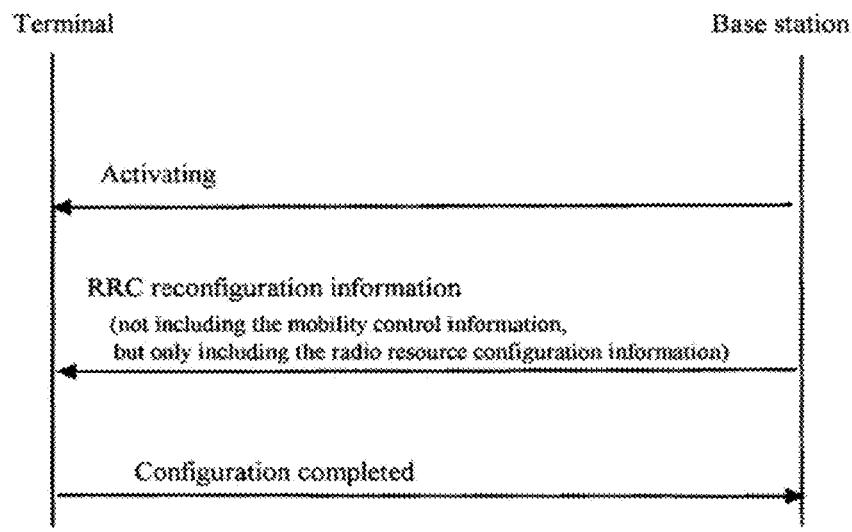
FIG. 27 is a schematic diagram of a reconfiguring flow in the method for updating a secondary component carrier.
Figure 28:
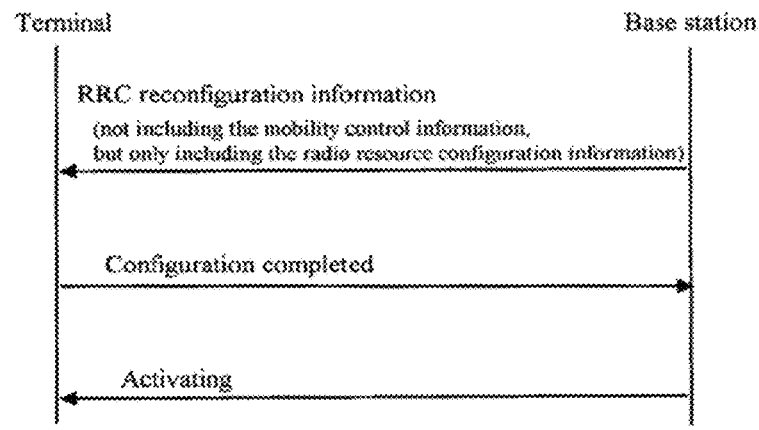
FIG. 28 is a schematic diagram of a variation of the reconfiguring flow.

In such a scene, it is also necessary to activate the carrier to be used as the new secondary component carrier which has not been initially configured yet, or which has been initially configured but not activated yet (FIGS. 27 and 28). For the secondary component carrier, when the reconfiguration in the present application is completed, the initial configuration thereof is completed (i.e., the adding of this carrier). The activation process is also relatively flexible in terms of time order. As shown in FIG. 28, during the activation process, the activating command can be sent by the base station after the configuration based on the RRC reconfiguration information is completed. Alternatively, as shown in FIG. 27, during the activation process, the activating command can also be sent by the base station before the RRC reconfiguration information is sent.

Likewise, the activating command can be combined or sent simultaneously with other commands. For example, the activating command can be sent together with the "radio resource control" reconfiguration information.

Twelfth Embodiment

The method for updating the component carrier described in the eighth to tenth embodiments can be performed by the base station and the terminal in cooperation in the communication system.

Therefore, in this embodiment, there is proposed a terminal, a base station and a communication system that are respectively able to implement the above embodiments.

In the description of the terminal, the base station and the communication system in this embodiment and the following embodiments, unless necessary, the detailed description of the various embodiments that have been described above will not be repeated any more, and reference can be made to the description of the various embodiments described above.

Figure 29:
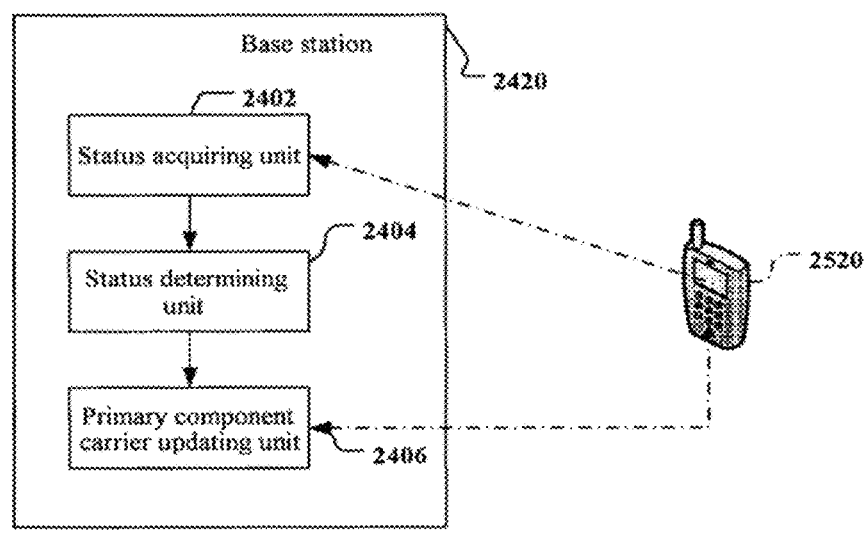
FIG. 29 is a schematic diagram of the structure of a base station adapted to update a primary component carrier according to an embodiment of the present application.

As shown in FIG. 29, a base station 2420 communicates with a terminal 2520 in a carrier aggregating communication network, and performs the updating of the primary component carrier. Specifically, the terminal includes: a status acquiring unit 2402 for acquiring the status information of the terminal, the base station and/or the primary component carrier; a status determining unit 2404 for determining whether the status information meets the predetermined condition; and a primary component carrier updating unit 2406 for replacing the old primary component carrier with the new primary component carrier in the case that the status information meets the predetermined condition.

Specifically, the status acquiring unit 2402 is used for acquiring the information based on which the status determining unit 2404 can determine whether the updating condition of the primary component carrier is satisfied. What information is to be obtained is dependent on the updating condition, and the updating condition in turn can be optionally set according to the specific application.

For example, the predetermined condition includes at least one of the following:

1. The terminal moves out of the coverage range of the old primary component carrier;
2. The signal quality of the old primary component carrier is degraded;
3. The physical resource amount for uplink and physical resource amount for downlink of the old primary component carrier is not enough;
4. The original base station requires to update the primary component carrier considering problems such as the balance of the overall load of the network and the interference between the users; and
5. The terminal moves into the coverage range of the new base station.

Then, for the conditions 1 and 5, the judgment must be made based on the position of the terminal and the coverage range of the primary component carrier of the corresponding base station. For the condition 2, it is necessary to acquire the signal quality information from the terminal. For the condition 3, it is necessary to acquire the related information from the base station. The condition 4 is completely a command from the base station.

Therefore, depending on what the predetermined condition specifically is, the status acquiring unit 2402 may only need to acquire the related information form the base station itself but not to interact with the terminal 2520, and may also need to interact with the terminal 2520 to acquire the related information. The specific manner for acquiring the information has been described in the description given with respect to the selecting of the component carrier, which will not be repeated any more here.

The primary component carrier updating unit 240 interacts with the terminal 2520 so as to perform the updating of the primary component carrier. As described above, all the updating of the primary component carriers can be performed by the handover flow. Therefore, in an embodiment, as shown in FIG. 30, the primary component carrier updating unit 2406 can include: a reconfiguration information transmitting unit 24062 for transmitting the "radio resource control" reconfiguration information to the terminal, the "radio resource control" reconfiguration information including the mobility control information which includes the information used by the terminal to reconfigure the MAC, PDCP and RLC layers and update the security key, and the radio resource configuration information used by the terminal to configure the new primary component carrier; and a random access unit 24064 for initiating the non-competitive random access or responding to the random access request from the terminal.

As described above, the handover flow includes the deactivating of the old primary component carrier. However, the deactivating command can be sent by the base station, or the implicit deactivating can also be performed by the terminal itself. In the former manner, the primary component carrier updating unit 2406 can further include a deactivating command transmitting unit 24066, for deactivating the old primary component carrier, as shown in FIG. 30. However, in the latter manner, the primary component carrier updating unit 2406 may not include the deactivating command transmitting unit 24066.

Figure 30:
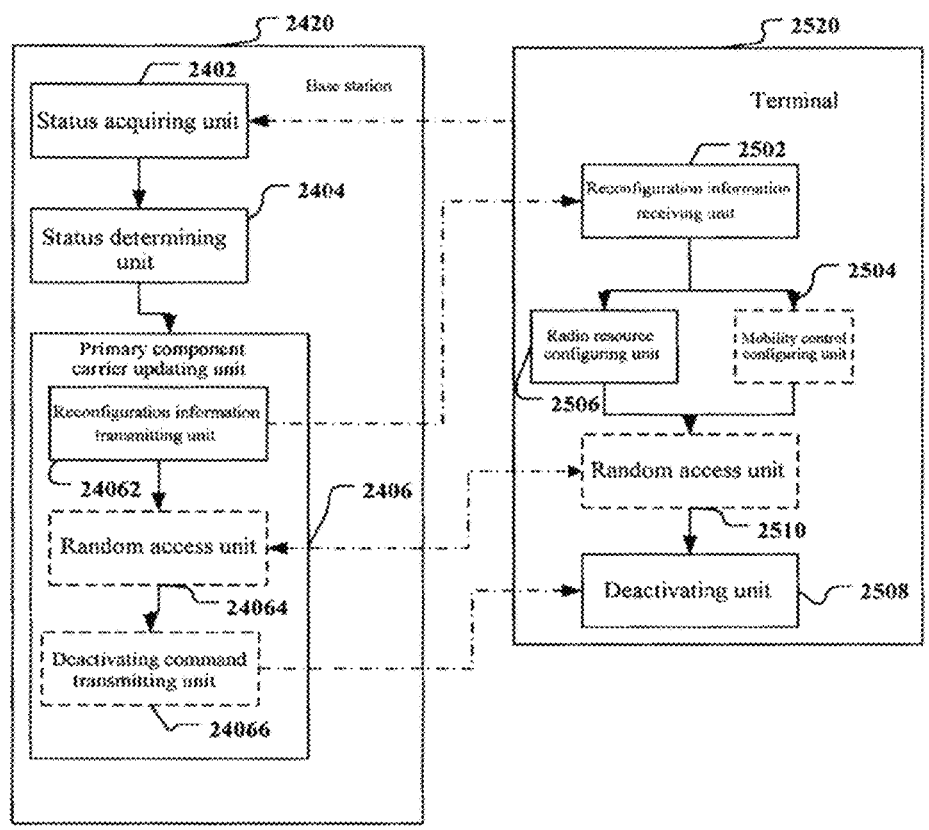
FIG. 30 is a schematic diagram of the structure of a base station and a corresponding terminal adapted to update a primary component carrier according to another embodiment of the present application.

Correspondingly, this embodiment further provides a corresponding terminal 2520 as shown in FIG. 30, and the terminal 2520 includes: a reconfiguration information receiving unit 2502 for receiving the "radio resource control" reconfiguration information from the base station; a mobility control configuring unit 2504 for reconfiguring the MAC, PDCP and RLC layers and updating the security key according to the "radio resource control" reconfiguration information; a radio resource configuring unit 2506 for configuring the new primary component carrier according to the radio resource configuration information contained in the "radio resource control" reconfiguration information; a random access unit 2510 for initiating the competitive random access or responding to the non-competitive random access initiated by the base station; and a deactivating unit 2508 for deactivating the old primary component carrier in accordance with the presetting or according to the deactivating command sent by the base station.

The above base station 2420 and terminal 2520 are adapted for performing the handover flow. Naturally, when the reconfiguring flow described above is completed, the "radio resource control" reconfiguration information which the reconfiguration information transmitting unit 24062 is configured to transmit to the terminal includes only the radio resource configuration information of the new primary component carrier, for configuring the new primary component carrier by the terminal 2520. Correspondingly, no function of the mobility control configuring unit 2504 is needed in the terminal 2520.

As described above, the reconfiguring flow generally has no random access process, and thus the above base station 2420 and terminal 2520 adapted for performing the reconfiguring flow both can have no random access unit. However, as described above, the base station 2420 and the terminal 2520 can also respectively contain the corresponding random access unit, so as to randomly access the new primary component carrier before the old primary component carrier is deactivated in the case that the new and old primary component carriers do not satisfy the following conditions. Such conditions are that the new and old primary component carriers are within the same frequency band, have the same time advance and both keep synchronous with the base station.

As described above, for the updating of the primary component carrier, the preferred manner is to properly select the handover flow or the reconfiguring flow depending on the application scene, and thus it is better for the base station and the terminal to each have the ability of processing the handover flow and the reconfiguring flow. For the terminal 2520, it can be seen from the above description that all the illustrated components of the terminal 2520 shown in FIG. 30 will be used in the handover flow, and only part of the components will be used in the reconfiguring flow. Therefore, it is believed that the terminal being able to perform the handover flow can also perform the reconfiguring flow.

Figure 31:
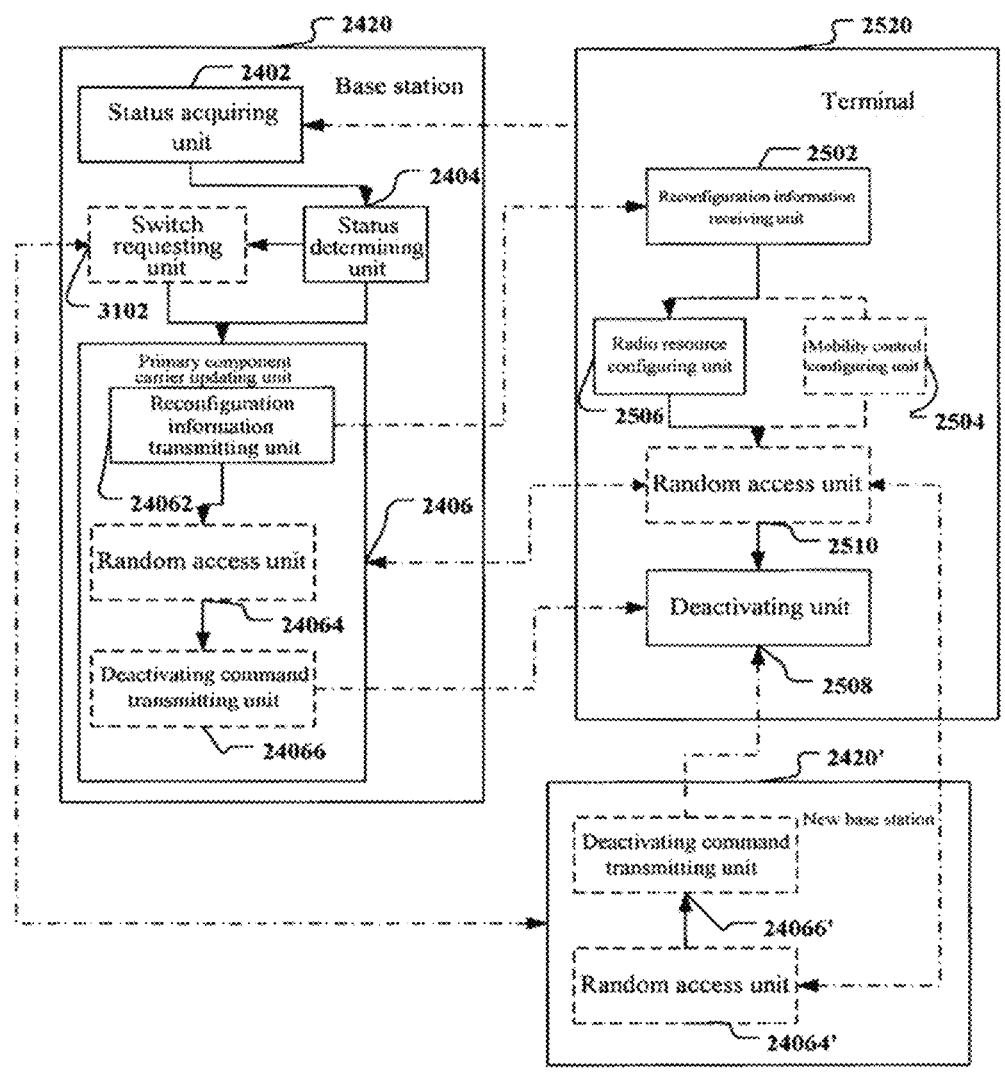
FIG. 31 is a schematic diagram of the structure of a base station and a corresponding terminal adapted to update a primary component carrier according to yet another embodiment of the present application.

However, the RRC reconfiguration information is transmitted by the base station, thus whether to use the handover flow or the reconfiguring flow is to be determined by the base station. Therefore, as shown in FIG. 31, in the base station 2420 that supports both the handover flow and the reconfiguring flow, the status determining unit 2404 can be further configured to judge whether the new and old primary component carriers belong to the same base station based on the information obtained by the status acquiring unit 2402. Of course, such judgment can also be made by any component in the base station 2420, and the result is notified to the primary component carrier updating unit 2406. Generally, for example, the base station itself knows the current primary component carrier of the terminal. However, during the selecting of the primary component carrier, the new primary component carrier is determined by the base station, or determined by the terminal and notified to the base station (for example, transmitting the request for updating the primary component carrier to the base station), and thus the base station can judge whether the new and old primary component carriers belong the same base station based on the above information. Because the terminal must request the base station which the terminal currently belongs to (i.e., the base station the old primary component carrier belongs to) for updating the primary component carrier, the above judgment of the base station is to judge whether the new primary component carrier is a carrier of the base station itself.

Correspondingly, the reconfiguration information transmitting unit 24062 can be configured to transmit different configuration information in different cases. That is, in the case that the new and old primary component carriers belong to the same base station, the "radio resource control" reconfiguration information transmitted to the terminal includes only the radio resource configuration information of the new primary component carrier, for configuring the new primary component carrier by the terminal; in the case that the new and old primary component carriers belong to different base stations, the "radio resource control" reconfiguration information includes the mobility control information which includes the information for reconfiguring the MAC, PDCP and RLC layers and updating the security key by the terminal, and the radio resource configuration information for configuring the new primary component carrier by the terminal.

Further, in the case that the new and old primary component carriers belong to different base stations and the handover flow is used, as described above, the random access unit 2510 of the terminal 2520 will interact with the random access unit 24064' of the new base station 2420', but not interact with the random access unit 24064 of the old base station 2420, as shown in FIG. 31. In this case, the random access unit 24064' of the new base station 2420' and the random access unit 24064 of the old base station 2420 can be the same component, but belong to different base station entities; but they can also be different components, and even the old base station 2420 is not necessarily the same as the new base station 2420'. However, in the ideal conditions, the old base station 2420 and the new base station 2420' should have the same structure, and only part of the components of the new base station 2420' is illustrated in FIG. 31 for conciseness. The deactivating unit mentioned hereinafter is similar to this.

If the terminal does not deactivate the old primary component carrier in the implicit manner, then the base station needs to use the deactivating command transmitting unit. Similar to the random access unit, in the case that the new and old primary component carriers belong to different base stations and the handover flow is used, the deactivating command should be transmitted by the new base station 2420', that is, the deactivating command transmitting unit 24066' of the new base station 2420' interacts with the deactivating unit 2508 of the terminal 2520, as shown in FIG. 31.

Further, in the case that the new and old primary component carriers belong to different base stations and the handover flow is used, since different base stations are involved, and association between different base stations is also involved. Therefore, the base station can further include a switch requesting unit 3102 for transmitting a handover request to the base station the new primary component carrier belongs to in the case that the new and old primary component carriers belong to different base stations, acquiring the related information from the base station the new primary component carrier belongs to, so as to prepare by the reconfiguration information transmitting unit the RRC reconfiguration information to be transmitted to the terminal. The details have been described in the method embodiments, which will not be repeated any more here.

Further, the primary component carrier updating unit can further include an activating command transmitting unit (not shown in the Figures), for transmitting the activating command before or while the reconfiguration information transmitting unit transmits the "radio resource control" reconfiguration information or after the terminal performs the configuration by using the "radio resource control" reconfiguration information, so as to activate the new primary component carrier, in the case that the new primary component carrier has not been initially configured or activated. Further, the base station can further include an initial configuring unit (not shown in the Figures), for transmitting to the terminal a command for initially configuring (adding) the primary component carrier, in the case that the new primary component carrier has not be configured initially.

Correspondingly, the terminal can further include a primary component carrier activating unit (not shown in the Figures) for receiving the activating command transmitted by the base station and activating the new primary component carrier. The terminal can further include an initial configuring unit (not shown in the Figures) for adding the primary component carrier in response to the command from the base station.

Naturally, as shown in FIGS. 29, 30 and 31, the above description further discloses a communication system consisting of the various embodiments of the above terminal and the various embodiments of the above base station.

Thirteenth Embodiment

The method described in the eleventh embodiment is performed by the base station and the terminal in cooperation in the communication system.

Therefore, in this embodiment, there is proposed a terminal, a base station and a communication system that are respectively able to implement the above embodiments.

In the description of the terminal, the base station and the communication system in this embodiment and the following embodiments, unless necessary, the detailed description of the various embodiments that have been described above will not be repeated any more, and reference can be made to the description of the various embodiments described above.

Figure 32:
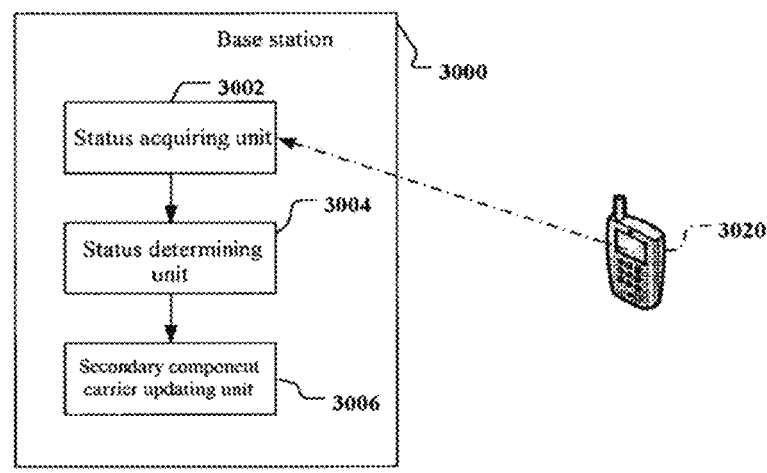
FIG. 32 is a schematic diagram of the structure of a base station adapted to update a secondary component carrier according to an embodiment of the present application.

As shown in FIG. 32, a base station 3000 communicates with a terminal 3020 in a carrier aggregating communication network, and performs the updating of the secondary component carrier. Specifically, the terminal includes: a status acquiring unit 3002 for acquiring the status information of the terminal, the base station and/or the secondary component carrier; a status determining unit 3004 for determining whether the status information meets the predetermined condition; and a secondary component carrier updating unit 3006 for adding the new secondary component carrier or replacing the old secondary component carrier with the new secondary component carrier in the case that the status information meets the predetermined condition.

Specifically, the status acquiring unit 3002 is used for acquiring the information based on which the status determining unit 3004 can determine whether the updating condition of the secondary component carrier is satisfied. What information is to be obtained is dependent on the updating condition, and the updating condition in turn can be optionally set according to the specific application.

For example, the predetermined condition includes at least one of the following:

1. More secondary component carriers are needed due to the requirement of service;
2. The terminal moves out of the coverage range of the old secondary component carrier;
3. The signal quality of the old secondary component carrier is degraded;
4. The physical resource amount for uplink and physical resource amount for downlink of the old secondary component carrier is not enough;
5. The original base station requires to update the secondary component carrier considering the problems such as the balance of the overall load of the network and the interference between the users; and
6. The terminal moves into the coverage range of the new base station Then, for the conditions 2 and 6, the judgment must be made based on the position of the terminal and the coverage range of the primary component carrier of the corresponding base station. For the condition 3, it is necessary to acquire the signal quality information from the terminal. For the condition 4, it is necessary to acquire the related information from the base station. The conditions 1 and 5 are completely a command from the base station.

Therefore, depending on what the predetermined condition specifically is, the status acquiring unit 3002 may only need to acquire the related information form the base station itself but not to interact with the terminal 3020, but it may also need to interact with the terminal 3020 to acquire the related information. The specific manner for acquiring the information has been described in the description given with respect to the selecting of the component carrier, which will not be repeated any more here.

The secondary component carrier updating unit 3006 interacts with the terminal 3002, so as to perform the updating of the secondary component carrier. In an embodiment, as shown in FIG. 33, the secondary component carrier updating unit 3006 can include: a reconfiguration information transmitting unit 30062 for transmitting the "radio resource control" reconfiguration information to the terminal, the "radio resource control" reconfiguration information including only the radio resource configuration information of the new secondary component carrier, for configuring the new secondary component carrier by the terminal.

Figure 33:
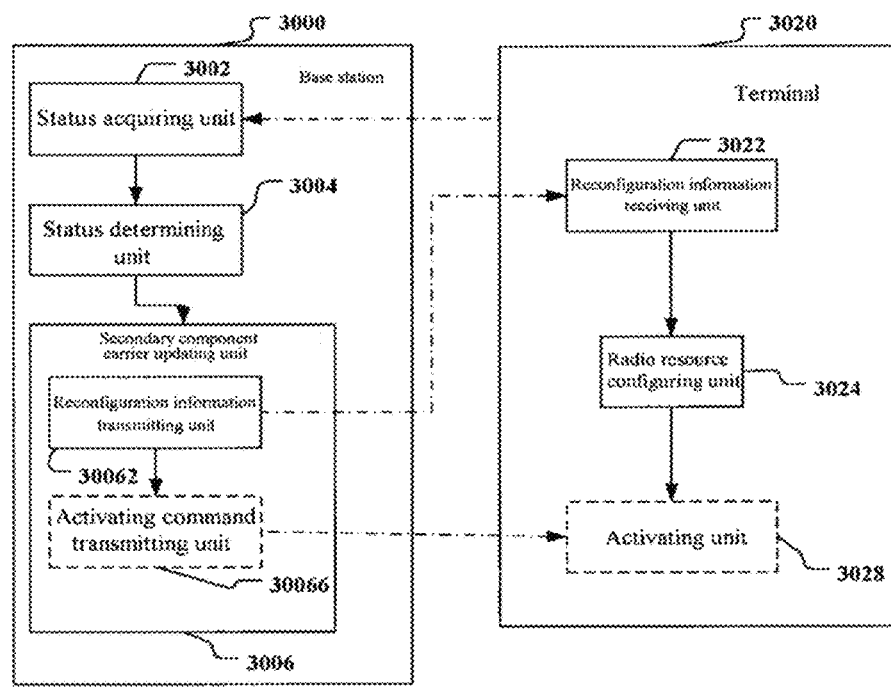
FIG. 33 is a schematic diagram of the structure of a base station and a corresponding terminal adapted to update a secondary component carrier according to another embodiment of the present application.

Correspondingly, this embodiment further provides a corresponding terminal 3020 as shown in FIG. 33, and the terminal 3020 includes: a reconfiguration information receiving unit 3022 for receiving the "radio resource control" reconfiguration information from the base station; and a radio resource configuring unit 3024 for configuring the new secondary component carrier according to the radio resource configuration information contained in the "radio resource control" reconfiguration information.

Further, the secondary component carrier updating unit 3006 can further include a activating command transmitting unit 30066, for transmitting the activating command after the new secondary component carrier is added or the old secondary component carrier is replaced with the new secondary component carrier, so as to activate the new secondary component carrier; alternatively, for transmitting the activating command before or while the reconfiguration information transmitting unit transmits the "radio resource control" reconfiguration information, so as to activate the new secondary component carrier, in the case that the new secondary component carrier has not been initially configured or activated.

Correspondingly, the terminal can further include a secondary component carrier activating unit 3028 for receiving the activating command transmitted by the base station and activating the new secondary component carrier.

Naturally, as shown in FIGS. 32 and 33 the above description further discloses a communication system consisting of the various embodiments of the above terminal and the various embodiments of the above base station.

Some of the embodiments of the present application have been described in detail in the above. As can be understood by those skilled in the art, all or any step or component of the method and the apparatus of the present invention can be implemented by hardware, firmware, software or the combination thereof in any computing device (including the communication device) including processor, storage medium or the like or the network (including the communication network) of the computing device, which can be implemented by those skilled in the art by using their basic programming skill with the knowledge of the content of the present invention, and thus will not be explained in detail here.

Further, it is obvious that when possible external operations are involved in the above description, it is evidently necessary to use any display device and any inputting device connected to any computing device and the corresponding interface and controlling program. To sum, the related hardware, software in the computer, computer system or computer network and the hardware, firmware, software or the combination thereof for implementing the above method of the present invention consist the device and the component thereof in the present invention.

Therefore, based on the above understanding, the object at the present invention can also be achieved by executing one program or a group of programs on any information processing device. The information processing device can be the well-known universal device. Thus, the object of the present invention can also be achieved by only providing the program product containing the program code for implementing the method or device. That is, such program product also constitutes the present invention, and the storage medium storing such program product also constitutes the present invention. Obviously, the storage medium can be any type of storage medium that is already known to those skilled in the art or that will be developed in future, including but not limited to floppy disk, optical disk, magnetic optical disk, memory card, memory stick or the like.

In the device and method of the present invention, it is obvious that various components or various steps can be divided, combined and/or divided and then recombined. Those division and/or recombination should be considered as the equivalent solution of the present invention.

It is to be further noted that the steps for performing the above series of processing can be performed chronologically according to the sequence of the description, but are unnecessarily performed in series in time order. Some steps can be performed in parallel or individually.

Further, although the above description is given one embodiment by one embodiment, it is to be understood that the various embodiments are not isolated. Obviously, those skilled in the art can understand that the various technical features contained in various embodiments can be combined optionally among various embodiments, as long as they do not conflict with each other. Evidently, all the technical features mentioned in the same embodiment can also be optionally combined, as long as they do not conflict with each other.

Finally, the terms "include", "comprise", "contain" or any other variation is intended to cover the non-exclusive inclusion, so that a process, method, article or device that includes a series of elements include not only those elements but also other elements not explicitly listed, or further include inherent elements of such process, method, article or device. In addition, in the case of no more limitations, an element defined by the sentence "comprise a" does not exclude the presence of other same elements in the process, method, article or device that includes an element.

Although the embodiments and the advantages thereof have been described in conjunction with the accompanying drawings, it should be understood that the embodiments described above are only for the purpose of illustration, but not to limit the present invention. Various modifications and variations can be made by those skilled in the art without departing from the substance and scope of the present invention. Therefore, the scope of the present invention is only defined by the appended claims and their equivalents, and various variations, substitutions and changes can be made without departing from the spirit and scope of the present invention defined by the appended claims.

What is claimed is:

1. An electronic device in a user equipment in a carrier aggregation communication network, comprising:
   circuitry configured to update a primary component carrier (PCC) that support communications with a plurality of base stations including at least a first base station and a second base station in a carrier aggregation communication scheme, including
   a transceiver configured to receive from at least one base station of the plurality of base stations Radio Resource Control (RRC) reconfiguration information that includes an updated PCC information and mobility control information, wherein
   the updated PCC is selected based on a distribution mode identifying a relationship between coverage ranges of component carriers in the carrier aggregation communication network, the coverage ranges of the component carriers indicating physical regions in which the respective component carriers are operational, the distribution mode being determined from among a plurality of predetermined distribution modes, the plurality of predetermined distribution modes being set according to a degree of overlap between a first regional coverage range of the component carriers of the first base station and a second regional coverage range of the component carriers of the second base station, and
   the circuitry is configured to reconfigure a Media Access Control (MAC) layer, a Packet Data Convergence Protocol (PDCP) layer and a Radio Link Control (RLC) layer, update a security key with the mobility control information in the RRC reconfiguration information, and reconfigure the primary component carrier as the updated PCC with the RRC reconfiguration information.

2. The electronic device of claim 1, wherein the transceiver is configured to receive a handover message from the at least one base station, and attempts to access the updated PCC as the primary component carrier by a random access procedure.

3. The electronic device of claim 2, wherein the random access procedure is one of contention-based random access and non-contention-based random access.

4. The electronic device of claim 1, wherein the transceiver receives the RRC reconfiguration information at a beginning of a handover procedure.

5. The electronic device of claim 1, wherein the PCC corresponds to a cell for initial access by the user terminal, and is replaced by another PCC identified in the updated PCC information.

6. The electronic device of claim 5, wherein the PCC corresponds to a cell for re-establishing a connection with the at least one base station, and is replaced by another PCC identified in the updated PCC information.

7. The electronic device of claim 1, wherein a handover related to updating the PCC is triggered autonomously by the at least one base station when a physical resource amount for uplink and/or downlink of the PCC is less than a threshold, and/or a network load and mutual user interference is unbalanced.

8. The electronic device of claim 1, wherein a candidate PCC having a same frequency as the PCC is selected as the updated PCC with a higher priority than other candidate PCCs that do not operate on the same frequency.

9. The electronic device of claim 1, wherein a candidate PCC is identified based on at least one of a moving direction of the user equipment, a moving speed of the user equipment, a coverage range, a signal quality and physical resource amount for uplink and downlink, interference magnitude, and load condition.

10. The electronic device of claim 1, wherein the electronic device is implemented as the user equipment.

11. The electronic device of claim 1, wherein the plurality of predetermined distribution modes include at least a first distribution mode, a second distribution mode, and a third distribution mode.

12. The electronic device of claim 1, wherein
   the first distribution mode is a mode where the first regional coverage range and the second regional coverage range are substantially coincident with each other,
   the second distribution mode is a mode where the first regional coverage range is larger than the second regional coverage range and substantially contains the second regional coverage range, and
   the third distribution mode is a mode where the first regional coverage range and the second regional coverage range are substantially neither coincident with each other nor contained one in the other but overlapped with each other.

13. A method for updating component carriers in a carrier aggregation communication network, comprising:
   updating a primary component carrier (PCC) that support communications with a plurality of base stations including at least a first base station and a second base station in a carrier aggregation communication scheme, including
   receiving from at least one base station of the plurality of base stations Radio Resource Control (RRC) reconfiguration information that includes an updated PCC information and mobility control information, wherein
   the updated PCC is selected based on a distribution mode identifying a relationship between coverage ranges of component carriers in the carrier aggregation communication network, the coverage ranges of the component carriers indicating physical regions in which the respective component carriers are operational, the distribution mode being determined from among a plurality of predetermined distribution modes, the plurality of predetermined distribution modes being set according to a degree of overlap between a first regional coverage range of the component carriers of the first base station and a second regional coverage range of the component carriers of the second base station, and the method further comprises reconfiguring a Media Access Control (MAC) layer, a Packet Data Convergence Protocol (PDCP) layer and a Radio Link Control (RLC) layer, updating a security key with the mobility control information in the RRC reconfiguration information, and reconfiguring the primary component carrier as the updated PCC with the RRC reconfiguration information.

14. The method of claim 13, wherein the method comprises receiving a handover message from the at least one base station, and attempting to access the updated PCC as the primary component carrier by a random access procedure.

15. The method of claim 14, wherein the random access procedure is one of contention-based random access and non-contention-based random access.

16. The method of claim 13, wherein the method comprises receiving the RRC reconfiguration information at a beginning of a handover procedure.

17. The method of claim 13, wherein the PCC corresponds to a cell for initial access by the user terminal, and is replaced by another PCC identified in the updated PCC information.

18. The method of claim 17, wherein the PCC corresponds to a cell for re-establishing a connection with the at least one base station, and is replaced by another PCC identified in the updated PCC information.

19. The method of claim 13, wherein a handover related to updating the PCC is triggered autonomously by the at least one base station when a physical resource amount for uplink and/or downlink of the PCC is less than a threshold, and/or a network load and mutual user interference is unbalanced.

20. The method of claim 13, wherein a candidate PCC having a same frequency as the PCC is selected as the updated PCC with a higher priority than other candidate PCCs that do not operate on the same frequency.

21. The method of claim 13, wherein a candidate PCC is identified based on at least one of a moving direction of the user equipment, a moving speed of the user equipment, a coverage range, a signal quality and physical resource amount for uplink and downlink, interference magnitude, and load condition.

22. A non-transitory computer storage medium that contains computer readable instructions that when executed by a processor performs a method for updating component carriers in a carrier aggregation communication network, the method comprising:

updating a primary component carrier (PCC) that support communications with a plurality of base stations including at least a first base station and a second base station in a carrier aggregation communication scheme, including receiving from at least one base station of the plurality of base stations Radio Resource Control (RRC) reconfiguration information that includes an updated PCC information and mobility control information, wherein the updated PCC is selected based on a distribution mode identifying a relationship between coverage ranges of component carriers in the carrier aggregation communication network, the coverage ranges of the component carriers indicating physical regions in which the respective component carriers are operational, the distribution mode being determined from among a plurality of predetermined distribution modes, the plurality of predetermined distribution modes being set according to a degree of overlap between a first regional coverage range of the component carriers of the first base station and a second regional coverage range of the component carriers of the second base station, and the method further comprises reconfiguring a Media Access Control (MAC) layer, a Packet Data Convergence Protocol (PDCP) layer and a Radio Link Control (RLC) layer, updating a security key with the mobility control information in the RRC reconfiguration information, and reconfiguring the primary component carrier as the updated PCC with the RRC reconfiguration information.

* * * * *